US009686034B2

United States Patent
Ruffini et al.

(10) Patent No.: US 9,686,034 B2
(45) Date of Patent: *Jun. 20, 2017

(54) METHODS OF TIME SYNCHRONIZATION IN COMMUNICATIONS NETWORKS

(71) Applicant: Telefonaktiebolaget L M Ericsson (publ), Stockholm (SE)

(72) Inventors: Stefano Ruffini, Rome (IT); Giulio Bottari, Livorno (IT)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 14/747,416

(22) Filed: Jun. 23, 2015

(65) Prior Publication Data

US 2015/0288473 A1 Oct. 8, 2015

Related U.S. Application Data

(63) Continuation of application No. 13/985,176, filed as application No. PCT/EP2011/056627 on Apr. 27, 2011, now Pat. No. 9,094,142.

(30) Foreign Application Priority Data

Feb. 15, 2011 (EP) .................................... 11154544

(51) Int. Cl.
*H04B 10/00* (2013.01)
*H04J 3/06* (2006.01)
(Continued)

(52) U.S. Cl.
CPC .......... *H04J 3/0658* (2013.01); *H04J 3/065* (2013.01); *H04J 3/0667* (2013.01); *H04J 14/00* (2013.01);
(Continued)

(58) Field of Classification Search
CPC .................... H04J 3/06–3/0697; H04L 7/00
See application file for complete search history.

(56) References Cited

U.S. PATENT DOCUMENTS

| 6,711,411 B1 * | 3/2004 | Ruffini | H04J 3/0641 370/350 |
| 8,462,821 B1 * | 6/2013 | Sagarwala | H04J 3/0667 370/503 |

(Continued)

FOREIGN PATENT DOCUMENTS

| CN | 1852049 A | 10/2006 |
| CN | 101043277 A | 9/2007 |

(Continued)

OTHER PUBLICATIONS

Davari, et al., "Transporting PTP messages (1588) pver MPLS Networks", TITOC Working Draft, Internet Draft, Sep. 22, 2010, 12 pages.

(Continued)

*Primary Examiner* — Li Liu
(74) *Attorney, Agent, or Firm* — Rothwell, Figg, Ernst & Manbeck, P.C.

(57) ABSTRACT

A method of providing a path delay asymmetry for time synchronization between a master clock at a first client node and a slave clock at a second client node. The method comprises: mapping a first time protocol signal (TPS) carrying master clock time protocol data (TPD) onto a first signal; determining a forward mapping delay ($d_{mf}$); mapping a second TPS carrying slave clock TPD onto a second signal; determining a reverse mapping delay ($d_{mr}$); applying FEC to the first signal, determining a forward FEC delay ($d_{fecf}$); applying FEC to the second signal; determining a reverse FEC delay ($d_{fecr}$); providing $d_{mf}$, $d_{mr}$, $d_{fecf}$ and $d_{fecr}$ to a calculation element; calculating a path delay asymmetry (Continued)

in dependence on $d_{mf}$, $d_{mr}$, $d_{fecf}$ and $d_{fecr}$; and providing it to a time protocol client at the second client node.

24 Claims, 14 Drawing Sheets

(51) Int. Cl.
H04L 7/00 (2006.01)
H04L 12/26 (2006.01)
H04J 14/00 (2006.01)
H04J 14/08 (2006.01)
H04L 1/00 (2006.01)

(52) U.S. Cl.
CPC ............ *H04J 14/08* (2013.01); *H04L 1/0083* (2013.01); *H04L 7/00* (2013.01); *H04L 43/0858* (2013.01); *H04J 2203/0085* (2013.01); *H04J 2203/0089* (2013.01); *H04L 1/0061* (2013.01)

(56) References Cited

U.S. PATENT DOCUMENTS

| | | | |
|---|---|---|---|
| 8,559,412 B1* | 10/2013 | Nicholls ........... | H04W 56/0015 370/350 |
| 2001/0055311 A1* | 12/2001 | Trachewsky ......... | H04L 1/0003 370/445 |
| 2002/0061012 A1* | 5/2002 | Thi .......................... | H04B 3/23 370/352 |
| 2005/0069039 A1* | 3/2005 | Crinon ................. | H04N 19/159 375/240.26 |
| 2006/0251084 A1* | 11/2006 | Elliot .................... | H04J 3/0673 370/398 |
| 2007/0147435 A1* | 6/2007 | Hamilton ................. | G06F 1/14 370/503 |
| 2007/0198878 A1 | 8/2007 | Dei | |
| 2008/0181112 A1* | 7/2008 | Beck ..................... | H04J 3/0632 370/235 |
| 2010/0040369 A1* | 2/2010 | Zhao ..................... | H04J 3/0664 398/58 |
| 2011/0051754 A1* | 3/2011 | Lansdowne ........... | H04J 3/0673 370/503 |

FOREIGN PATENT DOCUMENTS

| | | |
|---|---|---|
| CN | 101803301 A | 8/2010 |
| EP | 2448168 A1 | 5/2012 |
| GB | 1424857 | 2/1976 |
| RU | 2133489 C1 | 7/1999 |
| RU | 2356080 C1 | 5/2009 |
| WO | 2009023689 A2 | 2/2009 |
| WO | 2011017867 A1 | 2/2011 |

OTHER PUBLICATIONS

Na, et al., "Synchronization Performance of the Precision Time Protocol", 2007 International IEEE Symposium on Precision Clock Synchronization (ISPCS) for Measurement, Control and Communication, Vienna, Austria, Oct. 1-3, 2007, 8 pages.
Wang, et al., "1588v2 transmission by OSC over OTN", FH Corporation, SATR, ZTE Corporation, (R-C-TD): WD, Shenzhen, Oct. 18-22, 2010, 3 pages.
IEEE, "IEEE Standard for a Precision Clock Synchronization Protocol for Networked Measurement and Control Systems", IEEE Instrumentation and Measurement Society, IEE Std 1588, 2008, Jul. 24, 2008, 287 pages.
Katz, et al. "Traffic Engineering (TE) Extentions to OSPF Version 2", Network Working Group, Request for Comments: 3630, Updates 2370, Standard Tracks, Sep. 2003, 14 pages.
IEEE, "IEEE Standard for a Precision Clock Synchronization Protocol for Networked Measurement and Control Systems", IEEE Std 1588-2008, IEEE Instrumentation and Measurement Society, Jul. 24, 2008, 289 pages.
International Telecommunication Union, "Interfaces for the optical transport network", ITU-T Telecommunication Standardization Sector of ITU, G.709/Y.1331, Feb. 2012, 238 pages.
International Search Report and Written Opinion issued in Application No. PCT/EP2011/056627 dated Jun. 9, 2011, 17 pages.
Russian Decision to Grant a Patent issued in Application No. 2013142096/07(064437) dated Nov. 19, 2014, 15 pages.
International Preliminary Report on Patentability issued in Application No. PCT/EP2011/056627 dated May 19, 2015, 10 pages.
Chinese First Office Action issued in Application No. 201180067624.X dated Feb. 1, 2016, 7 pages.

\* cited by examiner

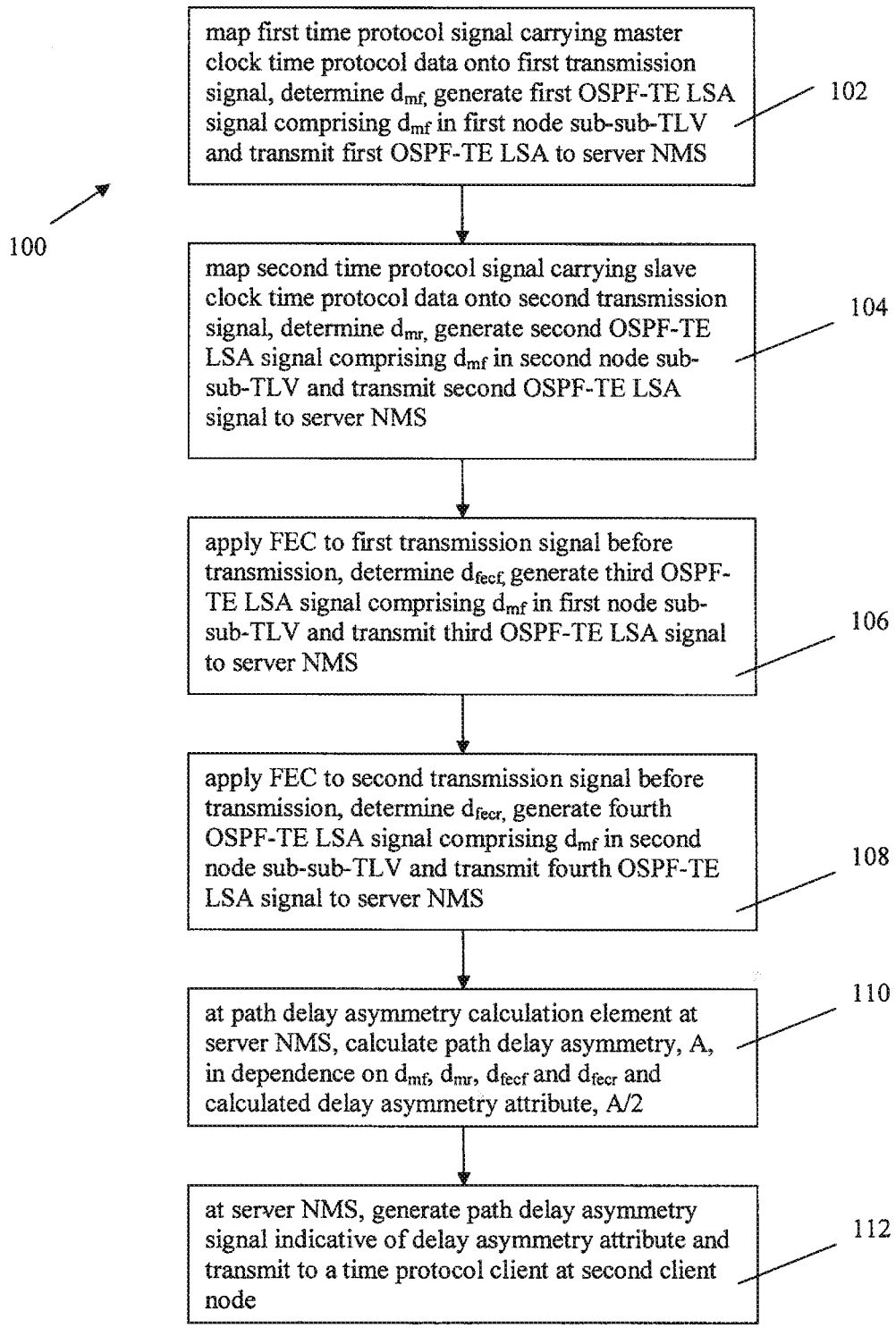

Fig.10.

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|           LSA age             |    Options    |      10       |
+-+-+-+-+-+-+-+-+-+-+-+-+-+-+-+-+-+-+-+-+-+-+-+-+-+-+-+-+-+-+-+-+
|       1       |                   Instance                    |
+-+-+-+-+-+-+-+-+-+-+-+-+-+-+-+-+-+-+-+-+-+-+-+-+-+-+-+-+-+-+-+-+
|                       Advertising Router                      |
+-+-+-+-+-+-+-+-+-+-+-+-+-+-+-+-+-+-+-+-+-+-+-+-+-+-+-+-+-+-+-+-+
|                        LS Sequence Number                     |
+-+-+-+-+-+-+-+-+-+-+-+-+-+-+-+-+-+-+-+-+-+-+-+-+-+-+-+-+-+-+-+-+
|          LS Checksum          |           LS Length           |
+-+-+-+-+-+-+-+-+-+-+-+-+-+-+-+-+-+-+-+-+-+-+-+-+-+-+-+-+-+-+-+-+
|         Type (2)(Link)        |          Length (110)         |
+-+-+-+-+-+-+-+-+-+-+-+-+-+-+-+-+-+-+-+-+-+-+-+-+-+-+-+-+-+-+-+-+
| Sub-Type (OTN.Spec)(TBD)(IANA)|          Length (108)         |
+-+-+-+-+-+-+-+-+-+-+-+-+-+-+-+-+-+-+-+-+-+-+-+-+-+-+-+-+-+-+-+-+
|   S-s-Type (First)(1)(IANA)   |          Length (36)          |
+-+-+-+-+-+-+-+-+-+-+-+-+-+-+-+-+-+-+-+-+-+-+-+-+-+-+-+-+-+-+-+-+
|                                                               |
~                            payload                            ~
|                                                               |
+-+-+-+-+-+-+-+-+-+-+-+-+-+-+-+-+-+-+-+-+-+-+-+-+-+-+-+-+-+-+-+-+
|   S-s-Type (Second)(2)(IANA)  |          Length (36)          |
+-+-+-+-+-+-+-+-+-+-+-+-+-+-+-+-+-+-+-+-+-+-+-+-+-+-+-+-+-+-+-+-+
|                                                               |
~                            payload                            ~
|                                                               |
+-+-+-+-+-+-+-+-+-+-+-+-+-+-+-+-+-+-+-+-+-+-+-+-+-+-+-+-+-+-+-+-+
|   S-s-Type (LinkPar)(3)(IANA) |          Length (36)          |
+-+-+-+-+-+-+-+-+-+-+-+-+-+-+-+-+-+-+-+-+-+-+-+-+-+-+-+-+-+-+-+-+
|                                                               |
~                            payload                            ~
|                                                               |
+-+-+-+-+-+-+-+-+-+-+-+-+-+-+-+-+-+-+-+-+-+-+-+-+-+-+-+-+-+-+-+-+
```

Fig.11.

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| S-s-Type (First)(1)(IANA)     |         Length (36)           |
+-+-+-+-+-+-+-+-+-+-+-+-+-+-+-+-+-+-+-+-+-+-+-+-+-+-+-+-+-+-+-+-+
|                            Parameter 1                        |
+-+-+-+-+-+-+-+-+-+-+-+-+-+-+-+-+-+-+-+-+-+-+-+-+-+-+-+-+-+-+-+-+
|                            Parameter 2                        |
+-+-+-+-+-+-+-+-+-+-+-+-+-+-+-+-+-+-+-+-+-+-+-+-+-+-+-+-+-+-+-+-+
|                            Parameter 3                        |
+-+-+-+-+-+-+-+-+-+-+-+-+-+-+-+-+-+-+-+-+-+-+-+-+-+-+-+-+-+-+-+-+
|                            Parameter 4                        |
+-+-+-+-+-+-+-+-+-+-+-+-+-+-+-+-+-+-+-+-+-+-+-+-+-+-+-+-+-+-+-+-+
|                            Parameter 5                        |
+-+-+-+-+-+-+-+-+-+-+-+-+-+-+-+-+-+-+-+-+-+-+-+-+-+-+-+-+-+-+-+-+
|                            Parameter 6                        |
+-+-+-+-+-+-+-+-+-+-+-+-+-+-+-+-+-+-+-+-+-+-+-+-+-+-+-+-+-+-+-+-+
```

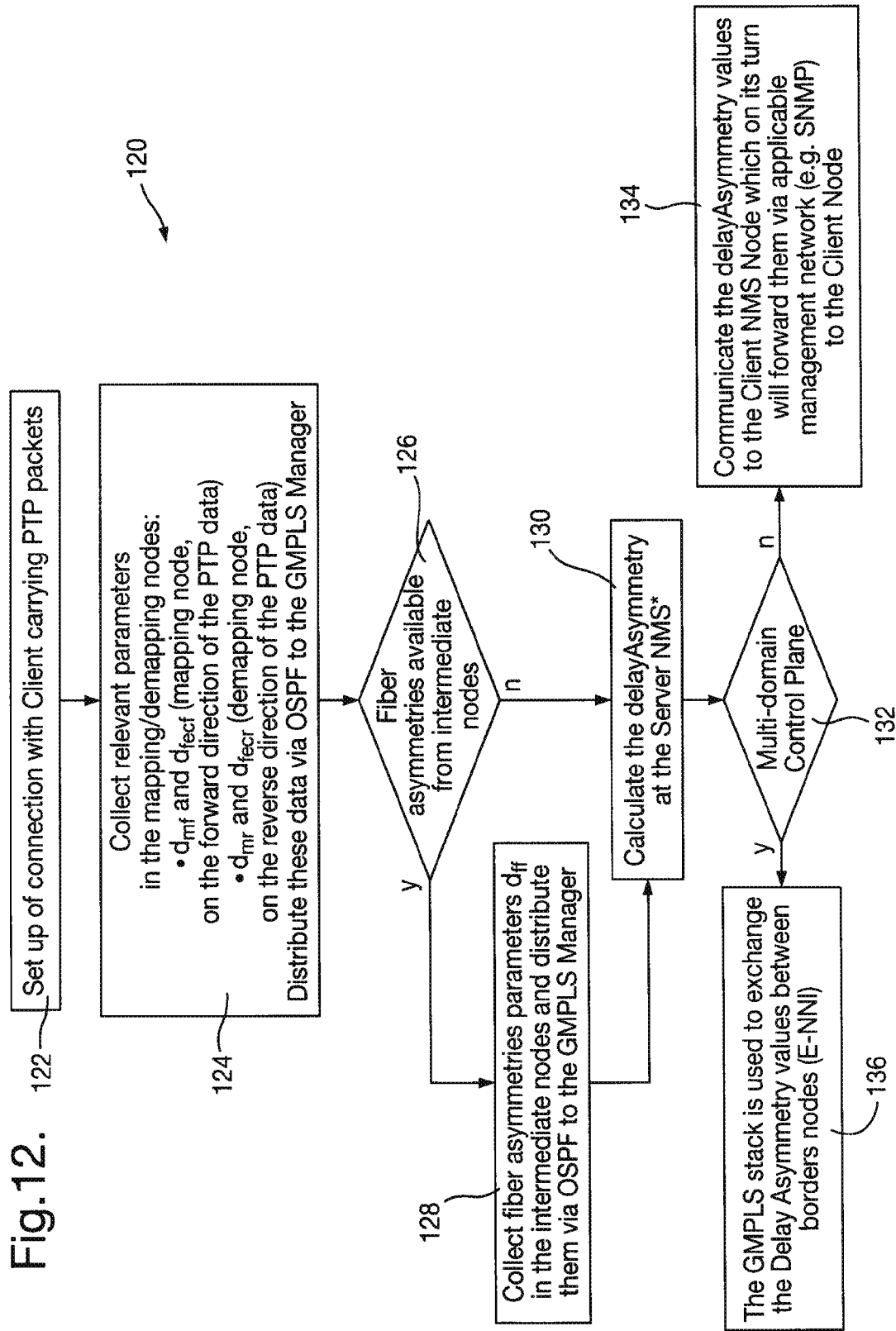

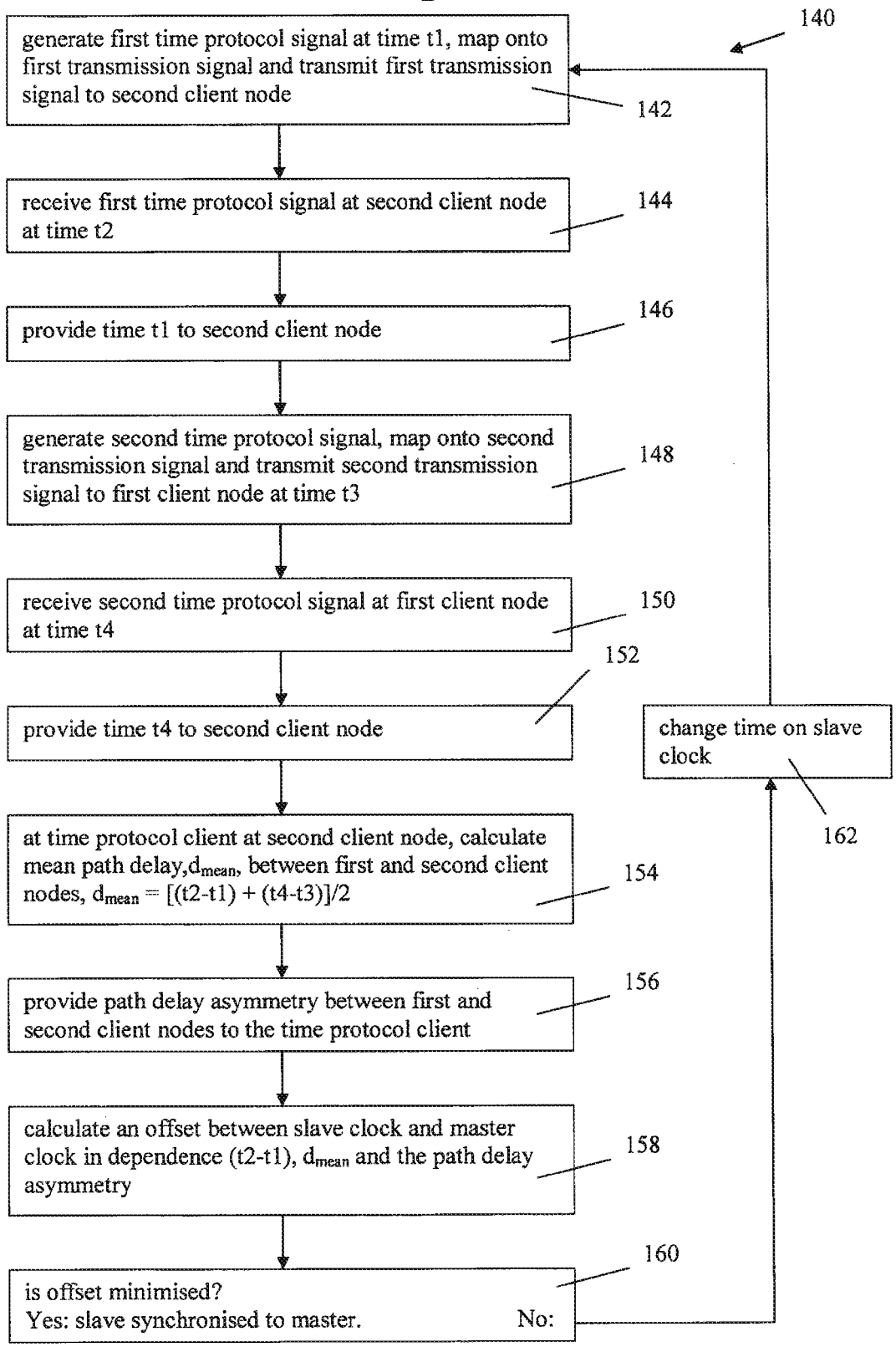

METHODS OF TIME SYNCHRONIZATION IN COMMUNICATIONS NETWORKS

CROSS-REFERENCE TO RELATED APPLICATIONS

This application is a continuation of U.S. patent application Ser. No. 13/985,176, having a section 371 date of Nov. 25, 2013 (published as US 2014/0079409), which is a 35 U.S.C. §371 National Phase Entry Application from PCT/EP2011/056627, filed Apr. 27, 2011 (published as WO 2012/110109), which claims priority to European Application No. 11154544.8, filed Feb. 15, 2011. The above identified applications and publications are incorporated by reference herein.

TECHNICAL FIELD

The invention relates to a method of providing a path delay asymmetry for time synchronization between a master clock at a first client node and a slave clock at a second client node across a communications network. The invention further relates to a method of synchronising a master clock at a first client node and a slave clock at a second client node across a communications network.

BACKGROUND

Communications networks require accurate time synchronization of clocks distributed across the network in order to properly operate. In a communications network comprising one or more client networks connected by an OTN communications network packet network, time synchronization information is carried across the OTN network by transmitting packets containing timestamp information. Timestamps are generated by a master (server) that has access to an accurate time reference, such as GPS, and transmitted across the OTN network to a receiving system (slave). The slave runs an algorithm that recovers the timing based on the timestamp of the packets and on their arrival times. When time synchronization is requested, a two-way timing protocol is mandatory where the transfer delay from master to slave shall be calculated. One fundamental assumption with this approach is that the master-to-slave and slave-to-master propagation times (path delays) across the OTN network are equal. This means that any asymmetry in the OTN network will significantly reduce the accuracy of the time synchronization between the master and slave clocks.

The solution currently proposed in the standards to allow accurate time sync transmission over OTN networks is to use the precision time protocol (PTP) defined in IEEE 1588 and to process PTP packets at each node in a path across the OTN network, by providing Transparent Clock or Boundary Clock functions at each node. Several methods have been proposed for implementing this approach including the use of the OTN packet overhead to transmit the PTP timing data, use of an optical supervisory, OSC, channel of the OTN network to transmit PTP data packets, and use of a general communications channel, GCC, channel of the OTN network to transmit PTP data packets.

Processing PTP data packets at each node during transmission across an OTN network may make it difficult to deal with multiple time synchronisation traffic flows, for example when multiple client networks operated by different network operators, share a single OTN network. It also requires that each node in the ( )N network must be configured to support IEEE 1588.

SUMMARY

It is an object to provide an improved method of providing a path delay asymmetry for time synchronization between a master clock at a first client node and a slave clock at a second client node across a server communications network. It is a further object to provide an improved method of synchronising a master clock at a first client node and a slave clock at a second client node across a server communications network.

A first aspect of the invention provides a method of providing a path delay asymmetry for time synchronization between a master clock at a first client node and a slave clock at a second client node across a server communications network. The method comprises mapping a first time protocol signal carrying time protocol data of the master clock onto a first transmission signal for transmission across the server communications network to the second client node. A forward mapping delay incurred as a result of said mapping is determined and the forward mapping delay is provided to a path delay asymmetry calculation element. The method further comprises mapping a second time protocol signal carrying time protocol data of the slave clock onto a second transmission signal for transmission across the server communications network to the first client node. A reverse mapping delay incurred as a result of said mapping is determined and the reverse mapping delay is provided to the path delay asymmetry calculation element. The method further comprises applying forward error correction, FEC, to the first transmission signal before said transmission. A forward FEC delay incurred as a result of applying said FEC to the second transmission signal is determined and the forward FEC delay is provided to the path delay asymmetry calculation element. The method further comprises applying FEC to the second transmission signal before said transmission. A reverse FEC delay incurred as a result of applying said FEC to the second transmission signal is determined and the reverse FEC delay is provided to the path delay asymmetry calculation element. The method further comprises, at the path delay asymmetry calculation element, calculating a path delay asymmetry in dependence on the forward mapping delay, the reverse mapping delay, the forward FEC delay and the reverse FEC delay. The method further comprises providing the path delay asymmetry to a time protocol client at the second client node.

Client node is used herein to refer to a border node of a client network, the first client node is therefore a first border node of a client network and the second client node is a second border node of a client network, which may be the same network as the first client network.

The method may enable a path delay asymmetry to be provided without processing time protocol data at each node in a path across a server communications network from a first border node of a client network to a second border node of a client network. The method may reduce the number of nodes in a server network which are required to process time protocol data. Providing the delays to a path delay asymmetry calculation element rather than processing time protocol data at each node may enable path delay asymmetries simultaneously to be provided for time synchronisation between master and slave clocks within different client networks, which may be operated by different network operators.

In an embodiment, the path delay asymmetry comprises a difference in a sum of the forward mapping delay and the forward FEC delay and a sum of the reverse mapping delay and the reverse FEC delay.

In an embodiment, the method further comprises determining a forward fibre delay incurred during transmission of the first transmission signal across the server communications network to the second client node. The forward fibre delay is provided to the path delay asymmetry calculation element. The method of this embodiment further comprises determining a reverse fibre delay incurred during transmission of the second transmission signal across the server communications network to the first client node. The reverse fibre delay is provided to the path delay asymmetry calculation element. The path delay asymmetry is calculated in dependence on the forward mapping delay, the reverse mapping delay, the forward FEC delay, the reverse FEC delay, the forward fibre delay and the reverse fibre delay.

In an embodiment, the path delay asymmetry comprises a difference in a sum of the forward mapping delay, the forward FEC delay and the forward fibre delay and a sum of the reverse mapping delay, the reverse FEC delay and the reverse fibre delay.

The method may therefore also account for asymmetry in optical fibre transmission delays, which may be due to transmission wavelength asymmetry or transmission path asymmetry.

In an embodiment, the method further comprises determining a difference in an ingress line rate and an egress line rate of the second mapping node. The line rate difference is provided to the path delay asymmetry calculation element. The path delay asymmetry is calculated in dependence on the forward mapping delay, the reverse mapping delay, the forward FEC delay, the reverse FEC delay and the line rate difference.

In an embodiment, the path delay asymmetry comprises the sum of the line rate difference and a difference in a sum of the forward mapping delay, the forward FEC delay and the forward fibre delay and a sum of the reverse mapping delay, the reverse FEC delay and the reverse fibre delay.

The method may therefore also account for asymmetry in the line rate in the forward and reverse direction across the server communications network.

In an embodiment, the path delay asymmetry calculation element is provided at a server network management system of the server communications network. Each said delay is provided to the path delay asymmetry calculation element by generating and transmitting a respective distribution signal indicative of each said delay to the server network management system. The path delay asymmetry is provided to the time protocol client by generating a path delay asymmetry signal indicative of the path delay asymmetry at the server network management system and transmitting the path delay asymmetry signal to the second client node.

Providing the forward and reverse mapping delay, forward and reverse FEC delay and any forward and reverse fibre delay to the server network management system, NMS, of the server network and calculating the path delay asymmetry at the server NMS and not within the server network, may be particularly advantageous in simultaneously providing path delay asymmetries for time synchronisation between master and slave clocks within different client networks, which may be operated by different network operators.

In an embodiment, the path delay asymmetry calculation element is provided at a client network management system of the client network comprising the second client node. Each said delay is provided to the path delay asymmetry calculation element by generating and transmitting a respective distribution signal indicative of each said delay to a server network management system of the server communications network. The method further comprises, at the server network management system, generating a re-distribution signal indicative of each said delay. The re-distribution signal is transmitted on an inter-network management system communications channel of the server communications network to the client network management system. The path delay asymmetry is provided to the time protocol client by generating a path delay asymmetry signal indicative of the path delay asymmetry at the client network management system and transmitting the path delay asymmetry signal to the second client node.

The path delay asymmetry may therefore be calculated within the client network comprising the second client node. This may enable path delay asymmetries simultaneously to be calculated for different client networks.

In an embodiment, the first client node is coupled to the server communications network through a first border node of the server communications network and the second client node is coupled to the server communications network through a second border node of the server communications network. The first border node comprises a first mapping node and the second border node comprises a second mapping node. The first time protocol signal is mapped onto the first transmission signal at the first mapping node. The second time protocol signal is mapped onto the second transmission signal at the second mapping node. FEC is applied to the first transmission signal at the first mapping node and FEC is applied to the second transmission signal at the second mapping node. Each said forward delay is determined at the first mapping node and each said reverse delay is determined at the second mapping node. The path delay asymmetry calculation element is provided at the second mapping node and each said forward delay is provided to the path delay asymmetry calculation element by generating and transmitting a respective distribution signal indicative of each said forward delay to the second mapping node. The path delay asymmetry is provided to the time protocol client by generating a path delay asymmetry signal indicative of the path delay asymmetry at the second mapping node and transmitting the path delay asymmetry signal to the second client node.

Providing the forward delays to the second mapping node and calculating the path delay asymmetry at the second mapping node may enable path delay asymmetries simultaneously to be provided for time synchronisation between master and slave clocks within different client networks, which may be operated by different network operators.

In an embodiment, the first client node is coupled to the server communications network through a first border node of the server communications network and the second client node is coupled to the server communications network through a second border node of the server communications network. The first border node comprises a first mapping node and the second border node comprises a second mapping node. The first time protocol signal is mapped onto the first transmission signal at the first mapping node. The second time protocol signal is mapped onto the second transmission signal at the second mapping node. FEC is applied to the first transmission signal at the first mapping node and FEC is applied to the second transmission signal at the second mapping node. Each said forward delay is determined at the first mapping node and each said reverse delay is determined at the second mapping node. The path delay asymmetry calculation element is provided at the second client node. Each said forward delay is provided to the second mapping node by generating and transmitting a respective distribution signal indicative of each said forward delay to the second mapping node. Each said delay is provided to the path delay asymmetry calculation element by generating a delays signal indicative of each said delay at the second mapping node and transmitting the delays signal to the second client node.

Providing the forward delays to the second mapping node and providing each of the delays to the second client node may enable the path delay asymmetry to be calculated within the client network comprising the slave clock to be synchronised. This may enable path delay asymmetries simultaneously to be provided for time synchronisation between master and slave clocks within different client networks, which may be operated by different network operators.

In an embodiment, each distribution signal is transmitted across the control plane of the server communications network.

In an embodiment, each distribution signal comprises an open shortest path first traffic engineering protocol link state advertisement signal comprising a link type length value, TLV, object comprising a respective one of a first node sub-sub-TLV object and a second node sub-sub-TLV object, the first node sub-sub-TLV object comprising at least one of said forward delays and the second node sub-sub-TLV object comprising at least one of said reverse delays.

In an embodiment, the forward error correction comprises adaptive forward error correction.

In an embodiment, the first time protocol signal comprises a first Ethernet signal carrying one of precision time protocol data packets and network time protocol data packets. The second time protocol signal comprises a second Ethernet signal carrying one of precision time protocol data packets and network time protocol data packets. In an embodiment, the time protocol client at the second client node comprises one of a precision time protocol client and network time protocol client.

In an embodiment, each mapping node comprises a first in first out, FIFO, mapping buffer and each of the forward mapping delay and the reverse mapping delay is determined by measuring a depth of the respective FIFO mapping buffer.

In an embodiment, each mapping node comprises a coding buffer and each of the forward FEC delay and the reverse FEC delay is determined by measuring depth of the respective coding buffer.

In an embodiment, the method further comprises calculating a delay asymmetry attribute comprising one half of the path delay asymmetry and the path delay asymmetry signal is indicative of the delay asymmetry attribute.

In an embodiment, the server communications network comprises an optical communications network having an optical transport network, OTN, layer.

A second aspect of the invention provides a method of synchronising a master clock at a first client node and a slave clock at a second client node across a server communications network. The method comprises generating a first time protocol signal at the first client node at a first time, t1, mapping the first time protocol signal onto a first transmission signal, and transmitting the first transmission signal across the server communications network. The first time protocol signal is received at the second client node at a second time, t2. The first time is provided to the second client node. The method further comprises generating a second time protocol signal at the second client node, mapping the second time protocol signal onto a second transmission signal, and transmitting the second transmission signal across the server communications network at a third time, t3. The second time protocol signal is received at the first client node at a fourth time, t4, and the fourth time is provided to the second client node. The method further comprises, at a time protocol client at the second client node, calculating a mean path delay between the first client node and the second client node. The mean path delay comprises one half of the sum of the difference between t2 and one of t1 and t3 and the difference between t4 and the other of t1 and t3. The method further comprises providing a path delay asymmetry between the first client node and the second client node to the time protocol client. The method comprises mapping a first time protocol signal carrying time protocol data of the master clock onto a first transmission signal for transmission across the server communications network to the second client node. A forward mapping delay incurred as a result of said mapping is determined and the forward mapping delay is provided to a path delay asymmetry calculation element. The method further comprises mapping a second time protocol signal carrying time protocol data of the slave clock onto a second transmission signal for transmission across the server communications network to the first client node. A reverse mapping delay incurred as a result of said mapping is determined and the reverse mapping delay is provided to the path delay asymmetry calculation element. The method further comprises applying forward error correction, FEC, to the first transmission signal before said transmission. A forward FEC delay incurred as a result of applying said FEC to the second transmission signal is determined and the forward FEC delay is provided to the path delay asymmetry calculation element. The method further comprises applying FEC to the second transmission signal before said transmission. A reverse FEC delay incurred as a result of applying said FEC to the second transmission signal is determined and the reverse FEC delay is provided to the path delay asymmetry calculation element. The method further comprises, at the path delay asymmetry calculation element, calculating a path delay asymmetry in dependence on the forward mapping delay, the reverse mapping delay, the forward FEC delay and the reverse FEC delay. The method further comprises providing the path delay asymmetry to a time protocol client at the second client node. The method further comprises calculating an offset between the slave clock and the master clock in dependence on a difference between t2 and t1, the mean path delay and the path delay asymmetry. A time of the slave clock is varied to minimise the offset.

Client node is used herein to refer to a border node of a client network, the first client node is therefore a first border node of a client network and the second client node is a second border node of a client network, which may be the same network as the first client network.

The method may enable clocks at first and second border nodes of a client network to be synchronised across server network without processing time protocol data at each node in a path across the server network from the first border node to a second border node. The method may reduce the number of nodes in a server network which are required to process time protocol data during time synchronisation. Providing the delays to a path delay asymmetry calculation element rather than processing time protocol data at each node may enable path delay asymmetries simultaneously to be provided for time synchronisation between master and slave clocks within different client networks, which may be operated by different network operators.

In an embodiment, the path delay asymmetry comprises a difference in a sum of the forward mapping delay and the forward FEC delay and a sum of the reverse mapping delay and the reverse FEC delay.

In an embodiment, the method further comprises determining a forward fibre delay incurred during transmission of the first transmission signal across the server communications network to the second client node. The forward fibre delay is provided to the path delay asymmetry calculation element. The method of this embodiment further comprises determining a reverse fibre delay incurred during transmission of the second transmission signal across the server communications network to the first client node. The reverse fibre delay is provided to the path delay asymmetry calculation element. The path delay asymmetry is calculated in dependence on the forward mapping delay, the reverse mapping delay, the forward FEC delay, the reverse FEC delay, the forward fibre delay and the reverse fibre delay.

In an embodiment, the path delay asymmetry comprises a difference in a sum of the forward mapping delay, the forward FEC delay and the forward fibre delay and a sum of the reverse mapping delay, the reverse FEC delay and the reverse fibre delay.

The method may therefore also account for asymmetry in optical fibre transmission delays, which may be due to transmission wavelength asymmetry or transmission path asymmetry.

In an embodiment, the method further comprises determining a difference in an ingress line rate and an egress line rate of the second mapping node. The line rate difference is provided to the path delay asymmetry calculation element. The path delay asymmetry is calculated in dependence on the forward mapping delay, the reverse mapping delay, the forward FEC delay, the reverse FEC delay and the line rate difference.

In an embodiment, the path delay asymmetry comprises the sum of the line rate difference and a difference in a sum of the forward mapping delay, the forward FEC delay and the forward fibre delay and a sum of the reverse mapping delay, the reverse FEC delay and the reverse fibre delay.

The method may therefore also account for asymmetry in the line rate in the forward and reverse direction across the server communications network.

In an embodiment, the path delay asymmetry calculation element is provided at a server network management system of the server communications network. Each said delay is provided to the path delay asymmetry calculation element by generating and transmitting a respective distribution signal indicative of each said delay to the server network management system. The path delay asymmetry is provided to the time protocol client by generating a path delay asymmetry signal indicative of the path delay asymmetry at the server network management system and transmitting the path delay asymmetry signal to the second client node.

Providing the forward and reverse mapping delay, forward and reverse FEC delay and any forward and reverse fibre delay to the server network management system, NMS, of the server communications network and calculating the path delay asymmetry at the server NMS and not within the server communications network, may be particularly advantageous in simultaneously providing path delay asymmetries for time synchronisation between master and slave clocks within different client networks, which may be operated by different network operators.

In an embodiment, the path delay asymmetry calculation element is provided at a client network management system of the client network comprising the second client node. Each said delay is provided to the path delay asymmetry calculation element by generating and transmitting a respective distribution signal indicative of each said delay to a server network management system of the server communications network. The method further comprises, at the server network management system, generating a re-distribution signal indicative of each said delay. The re-distribution signal is transmitted on an inter-network management system communications channel of the server communications network to the client network management system. The path delay asymmetry is provided to the time protocol client by generating a path delay asymmetry signal indicative of the path delay asymmetry at the client network management system and transmitting the path delay asymmetry signal to the second client node.

The path delay asymmetry may therefore be calculated within the client network comprising the second client node. This may enable path delay asymmetries simultaneously to be calculated for different client networks.

In an embodiment, the first client node is coupled to the server communications network through a first border node of the server communications network and the second client node is coupled to the server communications network through a second border node of the server communications network. The first border node comprises a first mapping node and the second border node comprises a second mapping node. The first time protocol signal is mapped onto the first transmission signal at the first mapping node. The second time protocol signal is mapped onto the second transmission signal at the second mapping node. FEC is applied to the first transmission signal at the first mapping node and FEC is applied to the second transmission signal at the second mapping node. Each said forward delay is determined at the first mapping node and each said reverse delay is determined at the second mapping node. The path delay asymmetry calculation element is provided at the second mapping node and each said forward delay is provided to the path delay asymmetry calculation element by generating and transmitting a respective distribution signal indicative of each said forward delay to the second mapping node. The path delay asymmetry is provided to the time protocol client by generating a path delay asymmetry signal indicative of the path delay asymmetry at the second mapping node and transmitting the path delay asymmetry signal to the second client node.

Providing the forward delays to the second mapping node and calculating the path delay asymmetry at the second mapping node may enable path delay asymmetries simultaneously to be provided for time synchronisation between master and slave clocks within different client networks, which may be operated by different network operators.

In an embodiment, the first client node is coupled to the server communications network through a first border node of the server communications network and the second client node is coupled to the server communications network through a second border node of the server communications network. The first border node comprises a first mapping node and the second border node comprises a second mapping node. The first time protocol signal is mapped onto the first transmission signal at the first mapping node. The second time protocol signal is mapped onto the second transmission signal at the second mapping node. FEC is applied to the first transmission signal at the first mapping node and FEC is applied to the second transmission signal at the second mapping node. Each said forward delay is determined at the first mapping node and each said reverse delay is determined at the second mapping node. The path delay asymmetry calculation element is provided at the second client node. Each said forward delay is provided to the second mapping node by generating and transmitting a respective distribution signal indicative of each said forward delay to the second mapping node. Each said delay is provided to the path delay asymmetry calculation element by generating a delays signal indicative of each said delay at the second mapping node and transmitting the delays signal to the second client node.

Providing the forward delays to the second mapping node and providing each of the delays to the second client node may enable the path delay asymmetry to be calculated within the client network comprising the slave clock to be synchronised. This may enable path delay asymmetries simultaneously to be provided for time synchronisation between master and slave clocks within different client networks, which may be operated by different network operators.

In an embodiment, each distribution signal is transmitted across the control plane of the server communications network. In an embodiment, each distribution signal comprises an open shortest path first traffic engineering protocol link state advertisement signal comprising a link type length value, TLV, object comprising a respective one of a first node sub-sub-TLV object and a second node sub-sub-TLV object, the first node sub-sub-TLV object comprising at least one of said forward delays and the second node sub-sub-TLV object comprising at least one of said reverse delays.

In an embodiment, the forward error correction comprises adaptive forward error correction.

In an embodiment, the first time protocol signal comprises a first Ethernet signal carrying one of precision time protocol data packets and network time protocol data packets. The second time protocol signal comprises a second Ethernet signal carrying one of precision time protocol data packets and network time protocol data packets.

In an embodiment, the time protocol client at the second client node comprises one of a precision time protocol client and network time protocol client.

In an embodiment, each mapping node comprises a first in first out, FIFO, mapping buffer and each of the forward mapping delay and the reverse mapping delay is determined by measuring a depth of the respective FIFO mapping buffer.

In an embodiment, each mapping node comprises a coding buffer and each of the forward FEC delay and the reverse FEC delay is determined by measuring depth of the respective coding buffer.

In an embodiment, the method further comprises calculating a delay asymmetry attribute comprising one half of the path delay asymmetry and the path delay asymmetry signal is indicative of the delay asymmetry attribute.

In an embodiment, the server communications network comprises an optical communications network having an optical transport network, OTN, layer.

A third aspect of the invention provides a data carrier having computer readable instructions embodied therein. The said computer readable instructions are for providing access to resources available on a processor. The computer readable instructions comprise instructions to cause the processor to perform any of the above steps of the method of providing a path delay asymmetry for time synchronization between a master clock at a first client node and a slave clock at a second client node across a server communications network.

A fourth aspect of the invention provides a data carrier having computer readable instructions embodied therein. The said computer readable instructions are for providing access to resources available on a processor. The computer readable instructions comprise instructions to cause the processor to perform any of the above steps of the method of synchronising a master clock at a first client node and a slave clock at a second client node across a server communications network.

BRIEF DESCRIPTION OF THE DRAWINGS

FIG. 9 shows the steps of a method of providing a path delay asymmetry for time synchronization between a master clock at a first client node and a slave clock at a second client node across a server communications network according to a seventh embodiment of the invention;

FIG. 10 shows an OSPF-TE LSA TLV tree which may be used for the OSPF-TE LSA signals of the method of FIG. 9;

FIG. 11 shows the first node sub-sub-TLV of the first OSPF-TE LSA of the method of FIG. 9;

FIG. 12 shows the steps of a method of providing a path delay asymmetry for time synchronization between a master clock at a first client node and a slave clock at a second client node across a server communications network according to an eighth embodiment of the invention;

FIG. 13 shows the steps of a method of synchronising a master clock at a first client node and a slave clock at a second client node across an across a server communications network according to a ninth embodiment of the invention.

DETAILED DESCRIPTION

Figure 1:
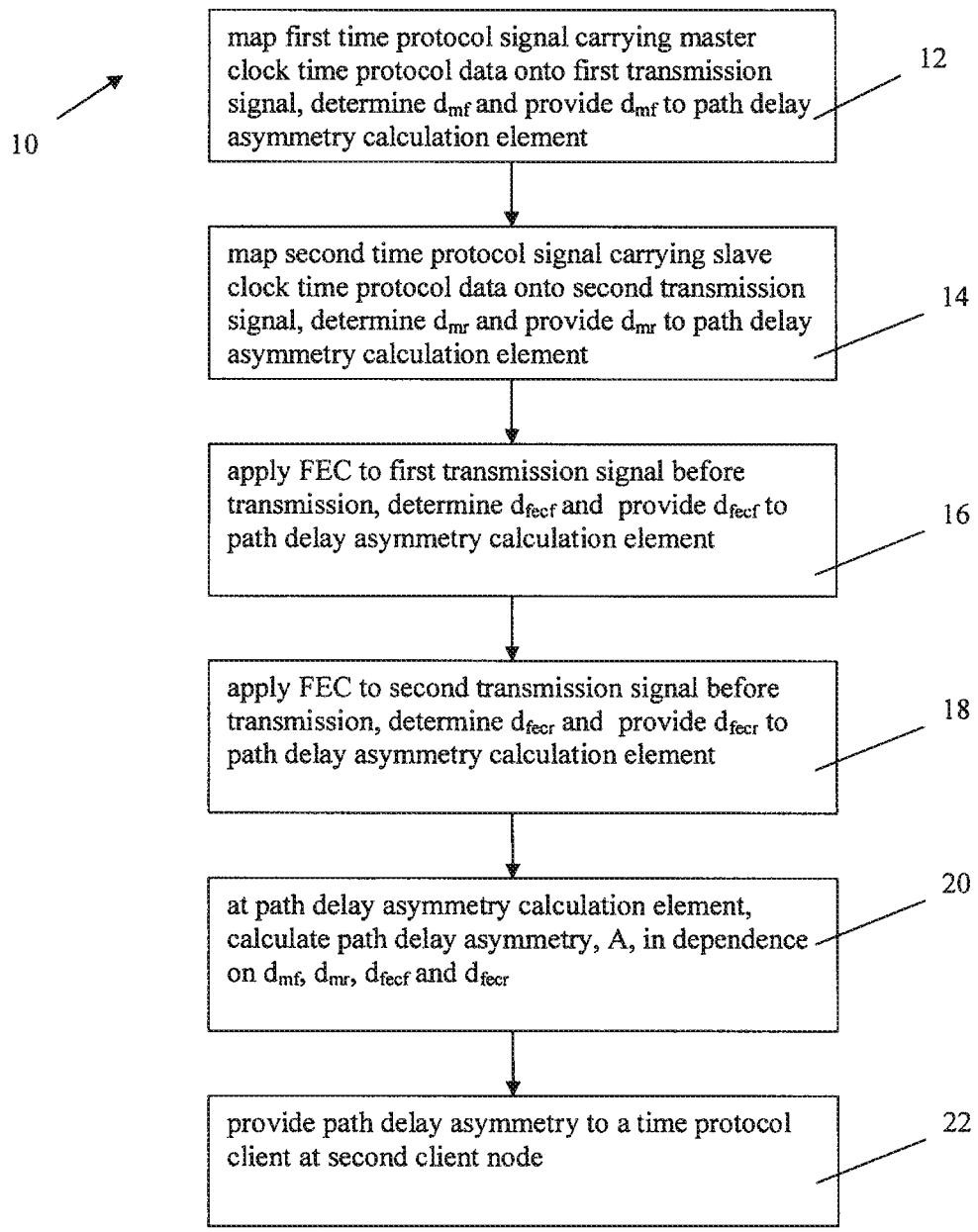
FIG. 1 shows the steps of a method of providing a path delay asymmetry for time synchronization between a master clock at a first client node and a slave clock at a second client node across a server communications network according to a first embodiment of the invention.

Referring to FIG. 1, a first embodiment of the invention provides a method 10 of providing a path delay asymmetry for time synchronization between a master clock at a first client node and a slave clock at a second client node across a server communications network.

The method 10 comprises: mapping a first time protocol signal carrying time protocol data of the master clock onto a first transmission signal for transmission across the server communications network to the second client node, determining a forward mapping delay, $d_{mf}$, incurred as a result of mapping the first time protocol signal onto the first transmission signal and providing $d_{mf}$ to a path delay asymmetry calculation element 12; mapping a second time protocol signal carrying time protocol data of the slave clock onto a second transmission signal for transmission across the server communications network to the first client node, determining a reverse mapping delay, $d_{mr}$, incurred as a result of mapping the second time protocol signal onto the second transmission signal and providing $d_{mr}$ to the path delay asymmetry calculation element 14; applying forward error correction, FEC, to the first transmission signal before transmission across the OTN network, determining a forward FEC delay, $d_{fecf}$, incurred as a result of applying FEC to the second transmission signal, and providing $d_{fecf}$ to the path delay asymmetry calculation element 16; applying FEC to the second transmission signal before transmission across the OTN network, determining a reverse FEC delay, $d_{fecr}$, incurred as a result of applying FEC to the second transmission signal, and providing $d_{fecr}$ to the path delay asymmetry calculation element 18; at the path delay asymmetry calculation element, calculating a path delay asymmetry in dependence on $d_{mf}$, $d_{mr}$, $d_{fecf}$ and $d_{fecr}$ 20; and providing the path delay asymmetry to a time protocol client at the second client node 22.

Figure 2:
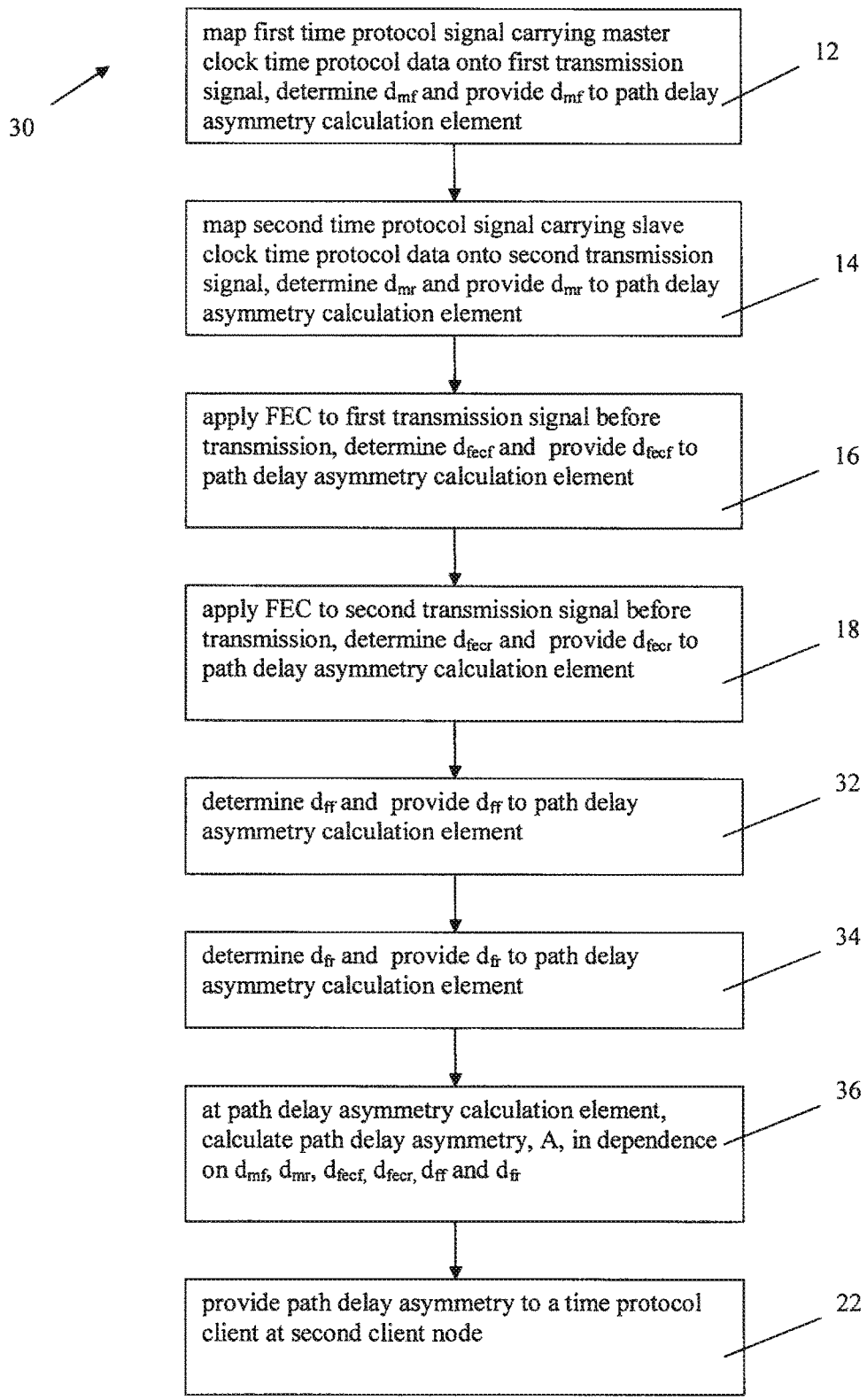
FIG. 2 shows the steps of a method of providing a path delay asymmetry for time synchronization between a master clock at a first client node and a slave clock at a second client node across a server communications network according to a second embodiment of the invention.

A second embodiment of the invention provides a method 30 of providing a path delay asymmetry for time synchronization between a master clock at a first client node and a slave clock at a second client node across a server communications network. The method 30 of this embodiment has the steps shown in FIG. 2 and is similar to the method 10 of FIG. 1, with the following modifications. The same reference numbers are retained for corresponding features.

In this embodiment, the method 30 further comprises determining a forward fibre delay, $d_{ff}$, incurred during transmission of the first transmission signal across the server communications network to the second client node and providing $d_{ff}$ to the path delay asymmetry calculation element 32. The method 30 further comprises determining a reverse fibre delay, $d_{fr}$, incurred during transmission of the second transmission signal across the OTN communications network to the first client node and providing $d_{fr}$ to the path delay asymmetry calculation element 34. The forward and reverse fibre delays may be determined using the method of measuring fibre delay described in U.S. 61/392,744 or other methods which will be well known to the skilled man. The difference between $d_{fr}$ and $d_{ff}$ may be related to different fibre length, different transmission wavelengths being used in the two directions or to the use of DCF (Dispersion Compensating Fibre) within the server communications network.

In this embodiment, the path delay asymmetry is calculated in dependence on $d_{mf}$, $d_{mr}$, $d_{fecf}$, $d_{fecr}$, $d_{ff}$ and $d_{fr}$ 36.

Figure 3:
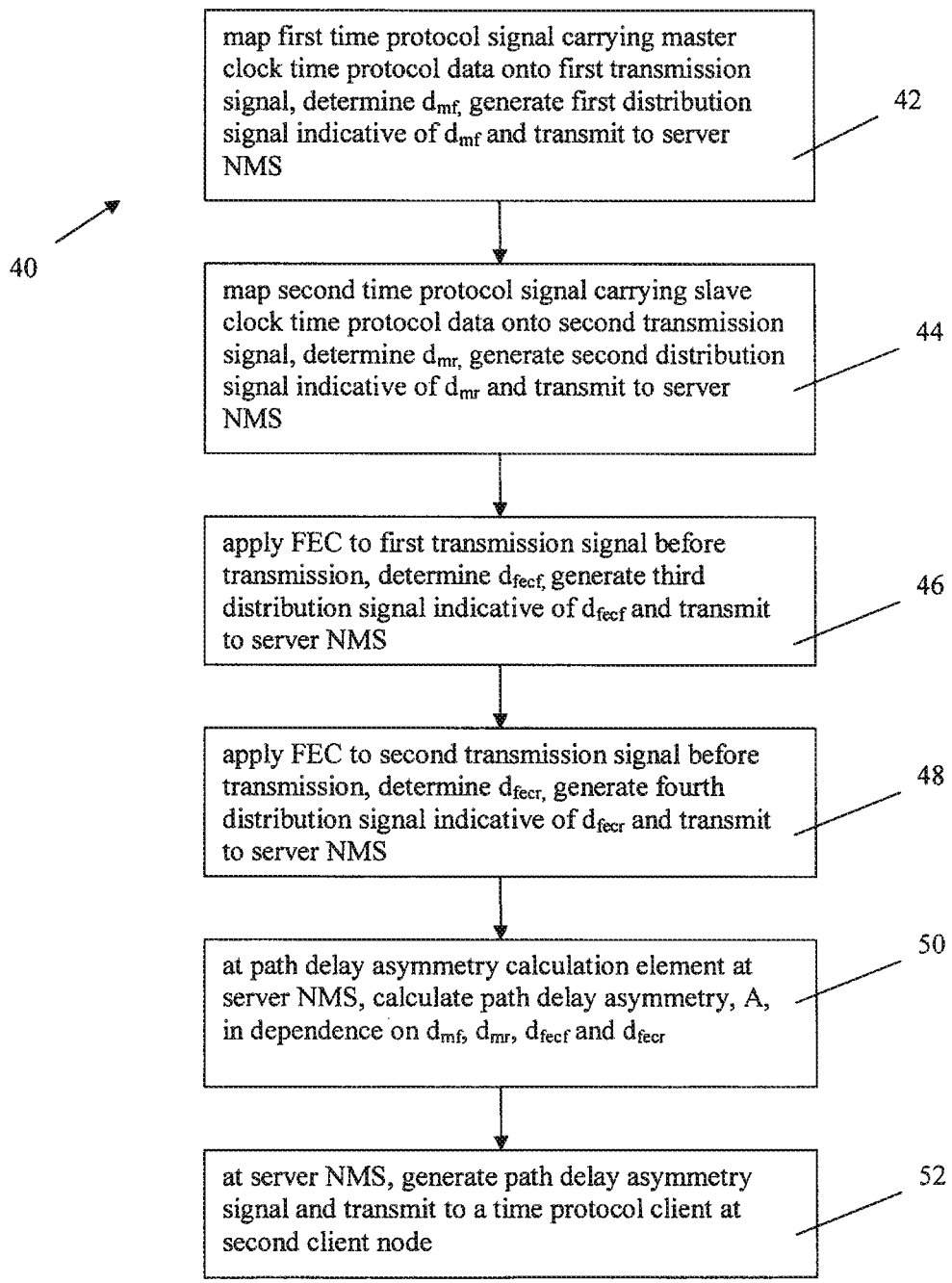
FIG. 3 shows the steps of a method of providing a path delay asymmetry for time synchronization between a master clock at a first client node and a slave clock at a second client node across a server communications network according to a third embodiment of the invention.

A third embodiment of the invention provides a method 40 of providing a path delay asymmetry for time synchronization between a master clock at a first client node and a slave clock at a second client node across a server communications network having the steps shown in FIG. 3.

In this embodiment, the path delay asymmetry calculation element is provided at a server network management system, NMS, of the server communications network.

The method 40 comprises: mapping a first time protocol signal carrying time protocol data of the master clock onto a first transmission signal for transmission across the server communications network to the second client node, determining a forward mapping delay, $d_{mf}$, incurred as a result of mapping the first time protocol signal onto the first transmission signal and generating a first distribution signal indicative of $d_{mf}$ and transmitting the first distribution signal to the server NMS 42; mapping a second time protocol signal carrying time protocol data of the slave clock onto a second transmission signal for transmission across the server communications network to the first client node, determining a reverse mapping delay, $d_{mr}$, incurred as a result of mapping the second time protocol signal onto the second transmission signal and generating a second distribution signal indicative of $d_{mf}$ and transmitting the second distribution signal to the server NMS 44; applying forward error correction, FEC, to the first transmission signal before transmission across the server network, determining a forward FEC delay, $d_{fecf}$, incurred as a result of applying FEC to the second transmission signal, and generating a third distribution signal indicative of $d_{mf}$ and transmitting the third distribution signal to the server NMS 46; applying FEC to the second transmission signal before transmission across the server network, determining a reverse FEC delay, $d_{fecr}$, incurred as a result of applying FEC to the second transmission signal, and generating a fourth distribution signal indicative of $d_{mf}$ and transmitting the fourth distribution signal to the server NMS 48; at the path delay asymmetry calculation element at the server NMS, calculating a path delay asymmetry in dependence on $d_{mf}$, $d_{mr}$, $d_{fecf}$ and $d_{fecr}$ 50; and at the sever NMS, generating a path delay asymmetry signal and transmitting the path delay asymmetry signal to a time protocol client at the second client node 52.

It will be appreciated that both of the forward delays may be provided to the server NMS in one distribution signal and both of the reverse delays may be provided to the server NMS in a second distribution signal.

Figure 4:
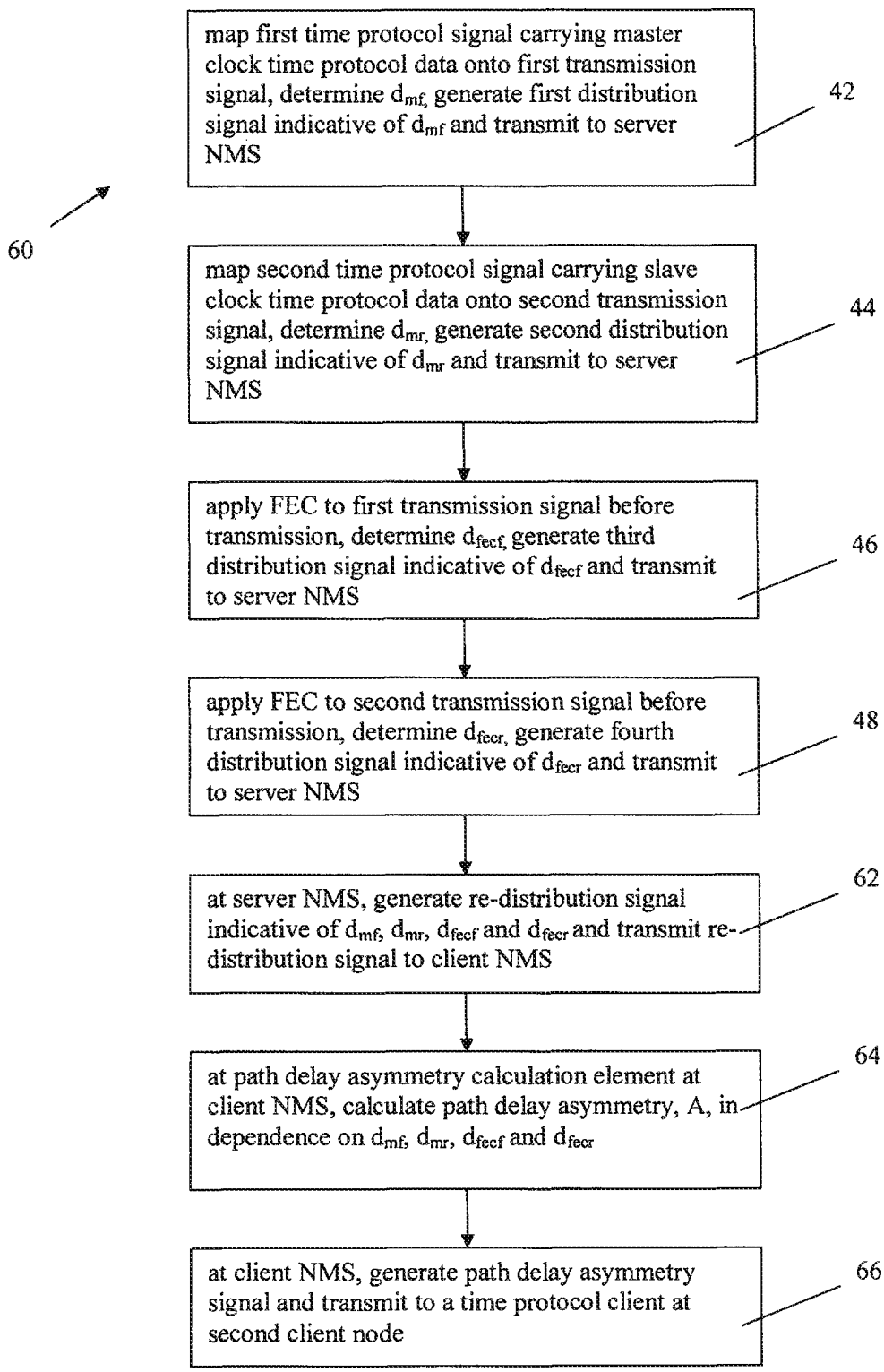
FIG. 4 shows the steps of a method of providing a path delay asymmetry for time synchronization between a master clock at a first client node and a slave clock at a second client node across a server communications network according to a fourth embodiment of the invention.

A fourth embodiment of the invention provides a method 60 of providing a path delay asymmetry for time synchronization between a master clock at a first client node and a slave clock at a second client node across a server communications network having the steps shown in FIG. 4.

In this embodiment, the path delay asymmetry calculation element is provided at a client network management system, NMS, of client network of which the second client node forms a part. The server network of this embodiment comprises a server NMS.

The method of this embodiment is similar to the method of FIG. 3, with the following modifications. The same reference numbers are retained for corresponding features.

In this embodiment, the method 60 comprises, at the server NMS, generating a re-distribution signal indicative of $d_{mf}$, $d_{mr}$, $d_{fecf}$ and $d_{fecr}$. The re-distribution signal is transmitted on an inter-NMS communications channel of the server communications network from the server NMS to the client NMS 62. The inter-NMS channel may, for example, comprise a shared internet protocol, IP, connection with the delays being transmitted in an XML file. The path delay asymmetry is calculated at the path delay asymmetry calculation element at the client NMS 64, in dependence on $d_{mf}$, $d_{mr}$, $d_{fecf}$ and $d_{fecr}$. The path delay asymmetry, A, is given by:

$$A=(d_{mf}+d_{fecf})-(d_{mr}+d_{fecr})$$

A path delay asymmetry signal indicative of the path delay asymmetry is generated at the client NMS and transmitted to a time protocol client at the second client node 66.

Figure 5:
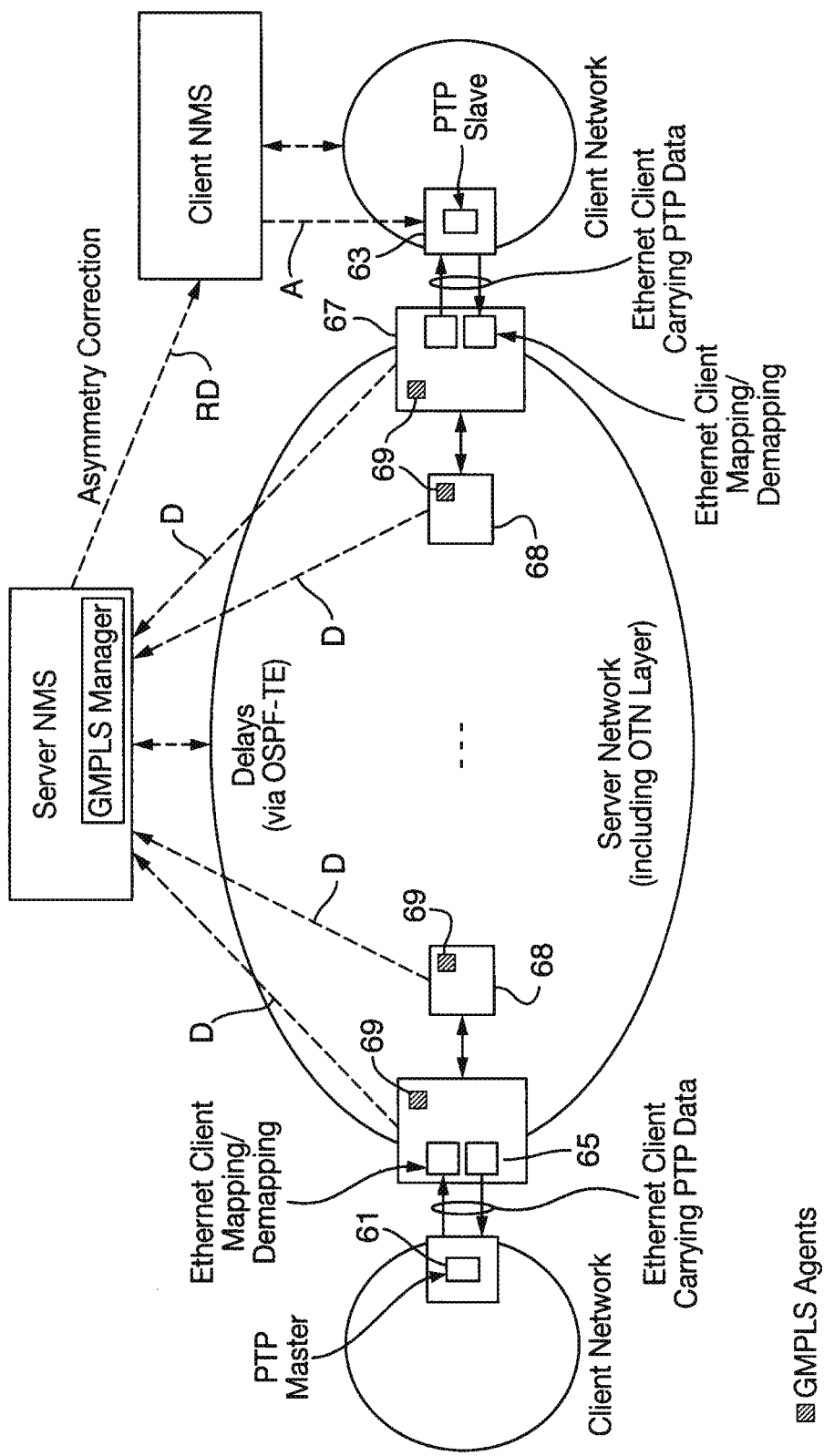
FIG. 5 is a schematic representation of a communications network system comprising a client network and a server communications network having an optical transport network, OTN, layer with which the method of FIG. 4 may be used.

FIG. 5 shows a communications network system comprising a client network, within which both the first client node 61 and the second client node 63 are provided, and a server communications network including an OTN layer. The communications network system further comprises a server NMS and a client NMS. The first client node 61 comprises a first border node of the client network and is coupled to the server network through a first border node 65 of the server network. The first border node is arranged to map a first time protocol signal onto a first transmission signal and is referred to herein as the first mapping node 65. The second client node 63 comprises a second border node of the client network and is coupled to the server network through a second border node 67 of the server network. The second border node is arranged to map a second time protocol signal onto a second transmission signal and is referred to herein as the second mapping node 67. The server network comprises a number of intermediate nodes 68 which form part of a path across the server network between the server border (mapping) nodes 65, 67.

The method 60 of providing a path delay asymmetry for time synchronization between a master clock at a first client node 61 and a slave clock at a second client node 63 across a server communications network having the steps shown in FIG. 4 may be applied to the communications network system of FIG. 5.

In this example, the first client node comprises an IEEE 1588 precision time protocol (PTP) client which forms part of a PTP distribution chain arranged to distribute PTP data from a PTP master. The PTP client of the first client node forms the master clock in the relationship with the second client node. The second client node comprises a PTP client comprising the slave clock (PTP slave). The PTP master is arranged to generate a first time protocol signal, which in this example comprises an Ethernet signal, carrying master clock PTP data and the PTP slave is arranged to generate a second Ethernet signal carrying slave clock PTP data.

The mapping nodes are arranged to map the respective Ethernet client signals onto transmission signals.

In this example, the server NMS comprises a GMPLS manager and each of the mapping nodes 65, 67 and the intermediate nodes 68 are provided with GMPLS agents 69. The GMPLS agents 69 generate and transmit the distribution signals, D, to the GMPLS manager at the server NMS. The server NMS generates and transmits the re-distribution signal, RD, to the client NMS. The client NMS generates and transmits the path delay asymmetry signal, indicative of the path delay asymmetry, A, to the second client node 63.

It will be appreciated that the path delay asymmetry may alternatively be calculated at the server NMS, as in the method described in FIG. 3, and the path delay asymmetry signal transmitted directly to the second client node 63 or transmitted to the second client node 63 via the client NMS.

Figure 6:
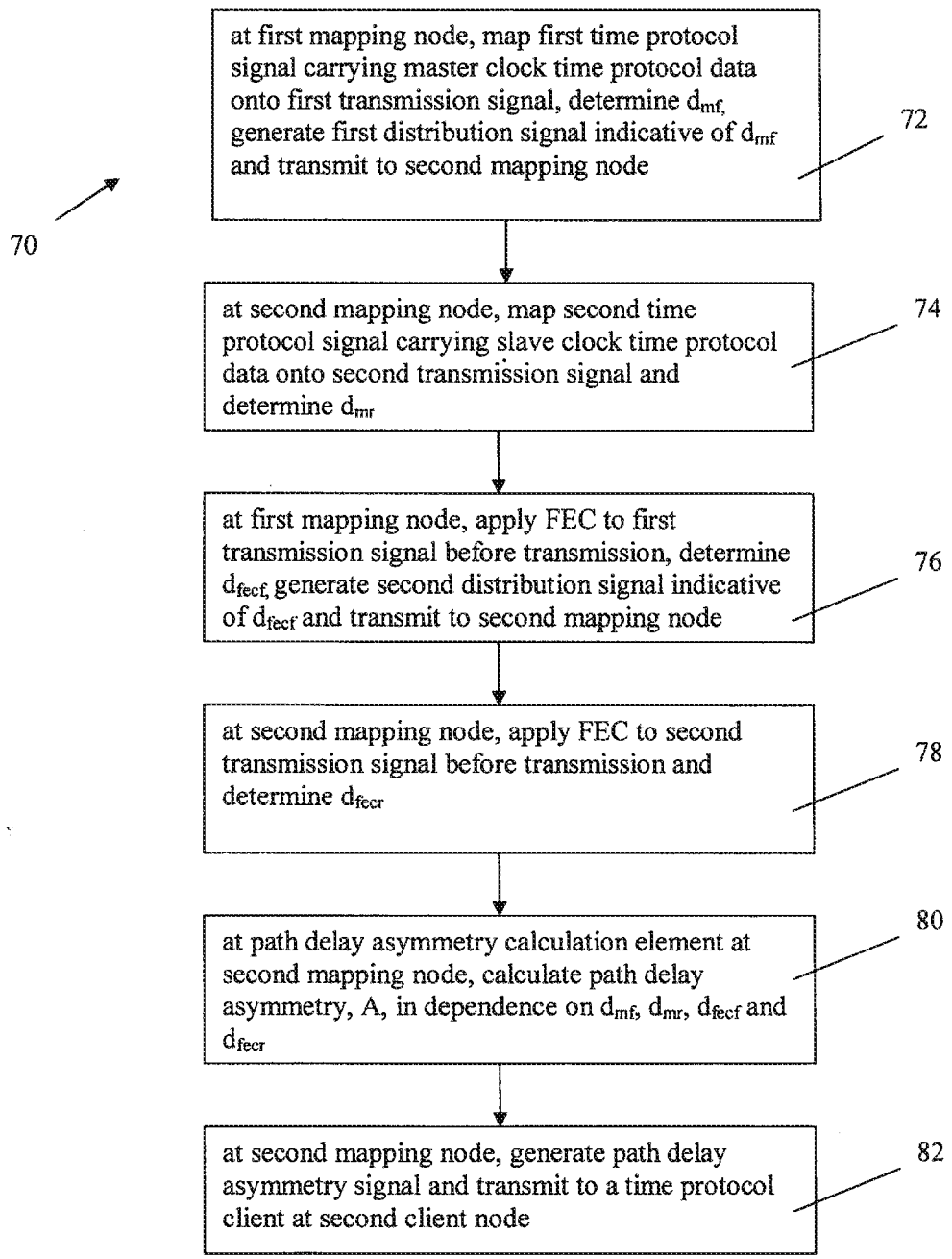
FIG. 6 shows the steps of a method of providing a path delay asymmetry for time synchronization between a master clock at a first client node and a slave clock at a second client node across a server communications network according to a fifth embodiment of the invention.

A fifth embodiment of the invention provides a method 70 of providing a path delay asymmetry for time synchronization between a master clock at a first client node and a slave clock at a second client node across a server communications network having the steps shown in FIG. 6.

In this embodiment, the server communications network has an OTN layer. The first client node is coupled to the server communications network through a first mapping node and the second client node is coupled to the server communications network through a second mapping node. Each client node is coupled to its respective mapping node via a respective external-network to network interface (E-NNI).

The method 70 comprises: at the first mapping node, mapping a first time protocol signal carrying time protocol data of the master clock onto a first transmission signal for transmission across the server network to the second client node, determining a forward mapping delay, $d_{mf}$, incurred as a result of mapping the first time protocol signal onto the first transmission signal and generating a first distribution signal indicative of $d_{mf}$ and transmitting the first distribution signal to the second mapping node 72; at the second mapping node, mapping a second time protocol signal carrying time protocol data of the slave clock onto a second transmission signal for transmission across the server network to the first client node, and determining a reverse mapping delay, $d_{mr}$, incurred as a result of mapping the second time protocol signal onto the second transmission signal 74; at the first mapping node, applying forward error correction, FEC, to the first transmission signal before transmission across the server network, determining a forward FEC delay, $d_{fecf}$, incurred as a result of applying FEC to the second transmission signal, and generating a third distribution signal indicative of $d_{mf}$ and transmitting the third distribution signal to the second mapping node 76; at the second mapping node, applying FEC to the second transmission signal before transmission across the server network, and determining a reverse FEC delay, $d_{fecr}$, incurred as a result of applying FEC to the second transmission signal 78; at the path delay asymmetry calculation element at the second mapping node, calculating a path delay asymmetry, A, in dependence on $d_{mf}$, $d_{mr}$, $d_{fecf}$ and $d_{fecr}$ 80; and at the second mapping node, generating a path delay asymmetry signal and transmitting the path delay asymmetry signal to a time protocol client at the second client node 82.

In this embodiment, the path delay asymmetry, A, is given by:

$$A=(d_{mf}+d_{fecf})-(d_{mr}+d_{fecr})$$

Figure 7:
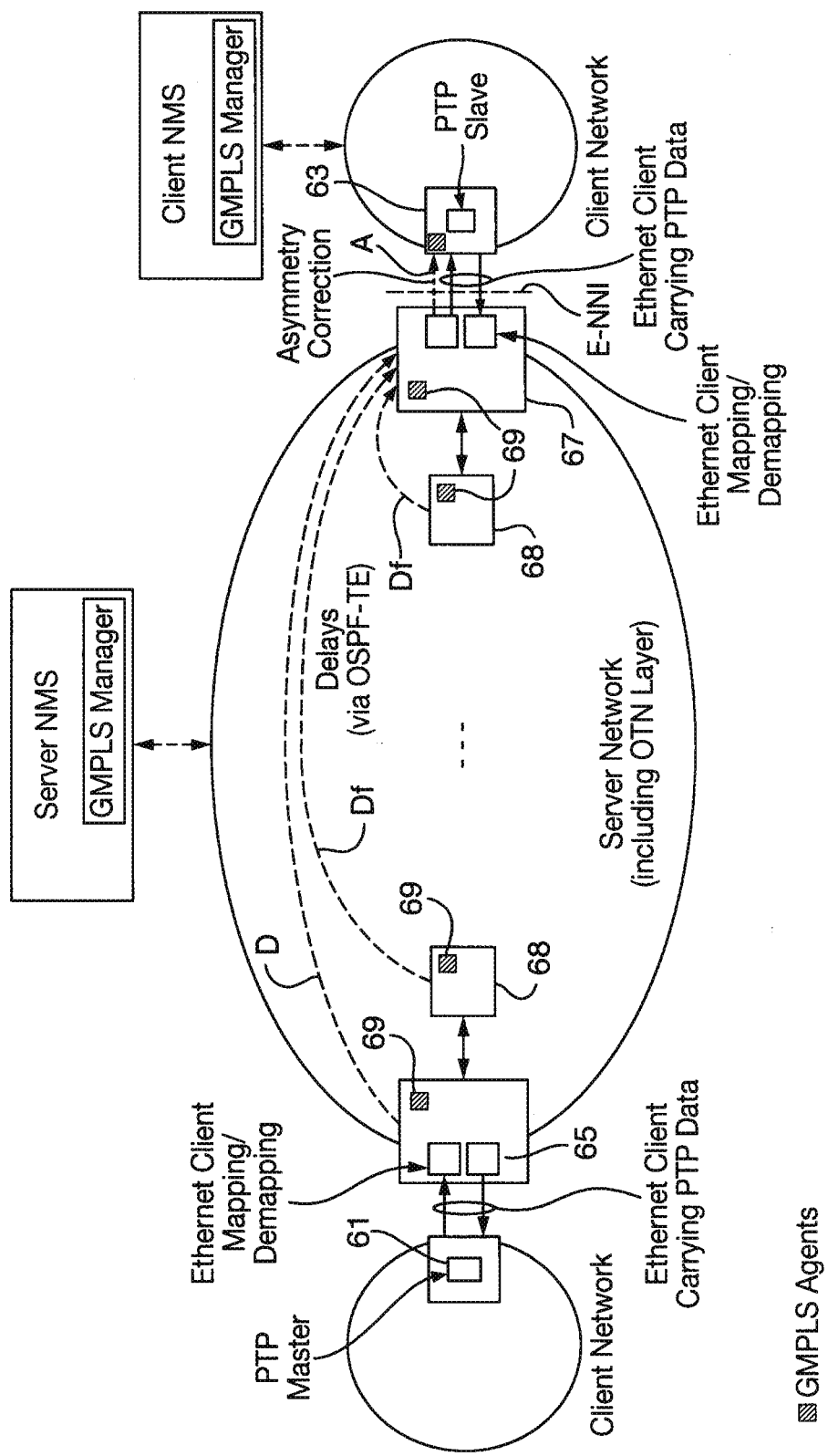
FIG. 7 is a schematic representation of a communications network system comprising a client network and a server communications network having an OTN layer with which the method of FIG. 5 may be used.

FIG. 7 shows a communications network which is similar to the communications network shown in FIG. 5, with the following modifications. The communications network of FIG. 7 is arranged to be used with the method of FIG. 6, with the following modifications.

In this example, the client NMS also comprises a GMPLS manager. The first mapping node 69 is arranged to generate and transmit a distribution signal, D, indicative of $d_{mf}$ and $d_{fecf}$. Each intermediate node 68 is arranged to generate and transmit a fibre delay, Df, signal indicative of the forward fibre delay, $d_{ff}$, and the reverse fibre delay, $d_{fr}$, on its fibre links 71.

Figure 8:
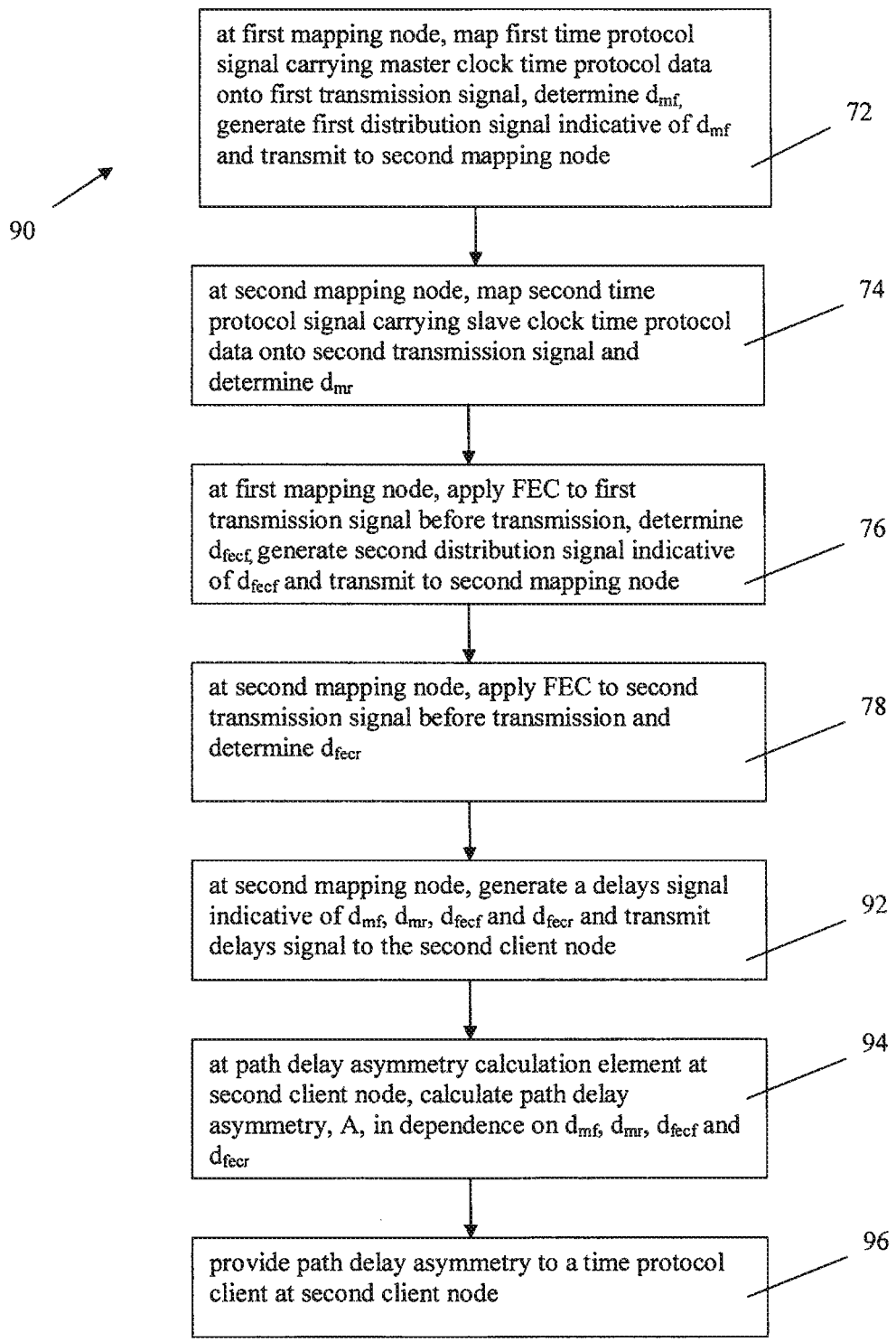
FIG. 8 shows the steps of a method of providing a path delay asymmetry for time synchronization between a master clock at a first client node and a slave clock at a second client node across a server communications network according to a sixth embodiment of the invention.

A sixth embodiment of the invention provides a method 90 of providing a path delay asymmetry for time synchronization between a master clock at a first client node and a slave clock at a second client node across a server communications network having the steps shown in FIG. 8.

The method 90 of this embodiment is similar to the method 70 of FIG. 6, with the following modifications. In this embodiment, following receipt of $d_{mf}$ and $d_{fecf}$ at the second mapping node and determining $d_{mr}$ and $d_{fecr}$, the method comprises generating a delays signal indicative of $d_{mf}$, $d_{mr}$, $d_{fecf}$ and $d_{fecr}$ and transmitting the delays signal to the second client node 92. The path delay asymmetry, A, is calculated at the path delay asymmetry calculation element at the second client node 94. In this embodiment, the path delay asymmetry, A, is given by:

$$A=(d_{mf}+d_{fecf})-(d_{mr}+d_{fecr})$$

The path delay asymmetry is then provided to a time protocol client at the second client node 96.

The steps of a method 100 of providing a path delay asymmetry for time synchronization between a master clock at a first client node and a slave clock at a second client node across server communications network according to a seventh embodiment of the invention are shown in FIG. 9.

In this embodiment, the first client node is coupled to the server communications network through a first mapping (border) node and the second client node is coupled to the server communications network through a second mapping (border) node. The server communications network of this embodiment includes an OTN layer.

In this embodiment, each distribution signal is transmitted across a control plane of the communications network. Each distribution signal comprises an open shortest path first traffic engineering, OSPF-TE, link state advertisement, LSA, control plane signal comprising a link type length value, TLV, object, as shown in FIG. 10. The link TLV comprises a node sub-sub-TLV object, as shown in FIG. 11. The node sub-sub-TLV comprises a number of parameter objects (parameters 1 to 6), which are allocated to respective ones of $d_{mf}$, $d_{mr}$, $d_{fecf}$, $d_{fecr}$, $d_{ff}$ and $d_{fr}$.

The method 100 of this embodiment comprises, at the first mapping node, mapping a first time protocol signal carrying master clock time protocol data onto first transmission signal, determining a forward mapping delay, $d_{mf}$, incurred as a result of mapping the first time protocol signal onto the first transmission signal 102. A first OSPF-TE LSA control plane signal comprising $d_{mf}$ in a first node sub-sub-TLV is generated and the first OSPF-TE LSA control plane signal is transmitted across the server communications network and delivered to a server NMS 102.

The method 100 of this embodiment further comprises, at the second mapping node, mapping a second time protocol signal carrying slave clock time protocol data onto second transmission signal, determining a reverse mapping delay, $d_{mr}$, incurred as a result of mapping the second time protocol signal onto the second transmission signal 104. A second OSPF-TE LSA control plane signal comprising $d_m$, in a second node sub-sub-TLV is generated and the second OSPF-TE LSA control plane signal is transmitted across the server network and delivered to the server NMS 104.

The method 100 of this embodiment further comprises, at the first mapping node, applying FEC to the first transmission signal before transmission across the server, network, and determining a forward FEC delay, $d_{fecf}$, incurred as a result of applying FEC to the second transmission signal. A third OSPF-TE LSA control plane signal comprising $d_{fecf}$ in a first node sub-sub-TLV is generated and the third OSPF-TE LSA control plane signal is transmitted across the server network and delivered to the server NMS 106.

The method 100 of this embodiment further comprises, at the second mapping node, applying FEC to the second transmission signal before transmission across the server network and determining a reverse FEC delay, $d_{fecr}$, incurred as a result of applying FEC to the second transmission signal. A fourth OSPF-TE LSA control plane signal comprising $d_{fecr}$ in a second node sub-sub-TLV is generated and the fourth OSPF-TE LSA control plane signal is transmitted across the server network control and delivered to the server NMS 108.

The method 100 further comprises, at the path delay asymmetry calculation element at the server NMS, calculating a path delay asymmetry in dependence on $d_{mf}$, $d_{mr}$, $d_{fecf}$ and $d_{fecr}$ 110. In this embodiment, the path delay asymmetry, A, is given by:

$$A=(d_{mf}+d_{fecf})-(d_{mr}+d_{fecr})$$

The method 100 further comprises calculating a delay asymmetry attribute, A/2 110.

A path delay asymmetry signal indicative of the delay asymmetry attribute is generated at the server NMS and transmitted to a time protocol client at the second client node 112.

The steps of a method 120 of providing a path delay asymmetry for time synchronization between a master clock at a first client node and a slave clock at a second client node across a server communications network according to an eighth embodiment of the invention are shown in FIG. 12. The method 120 of this embodiment is similar to the method 100 of FIG. 9.

The method 120 of this embodiment is described in relation to time synchronization across a server network having an OTN layer according to the PTP described in IEEE 1588. However it will be appreciated that the method of providing a path delay asymmetry may also be used in relation to time synchronization using NTP or any other similar time protocol.

The method 120 of this embodiment comprises setting up a connection with an Ethernet client carrying PTP packets of the master clock at the first client node 122. The method 120 further comprises determining $d_{mf}$ and $d_{fecf}$ at the mapping node on the forward direction of the PTP data (the first mapping node coupled to the first client node) and determining $d_{mr}$ and $d_{fecr}$ at the demapping node on the reverse direction of the PTP data (the second mapping node coupled to the second client node) and distributing $d_{mf}$, $d_{mr}$, $d_{fecf}$ and $d_{fecr}$ via OSPF control plane signals to the GMPLS manager at the server NMS of the server network.

The method 120 comprises determining whether forward and reverse fibre delays, $d_{ff}$ and $d_{fr}$, are available from the intermediate nodes of the server network in the communications path from the first mapping node to the second mapping node 126. If $d_{ff}$ and $d_{fr}$ are available, they are distributed via OSPF control plane signals to the GMPLS manager 128.

The method 120 comprises calculating the delay asymmetry at the server NMS 130.

If the server network comprises a multi-domain control plane, that is to say the server network connects to more than one client network, the delay asymmetry is communicated from the second mapping node to the second client node across an E-NNI between the nodes using GMPLS signalling.

If the server network comprises a single-domain control plane, the delay asymmetry is distributed from the server NMS to a client NMS of the client network comprising the second client node. The client NMS transmits the delay asymmetry to the client node across a management network, such as SNMP.

Figure 14:
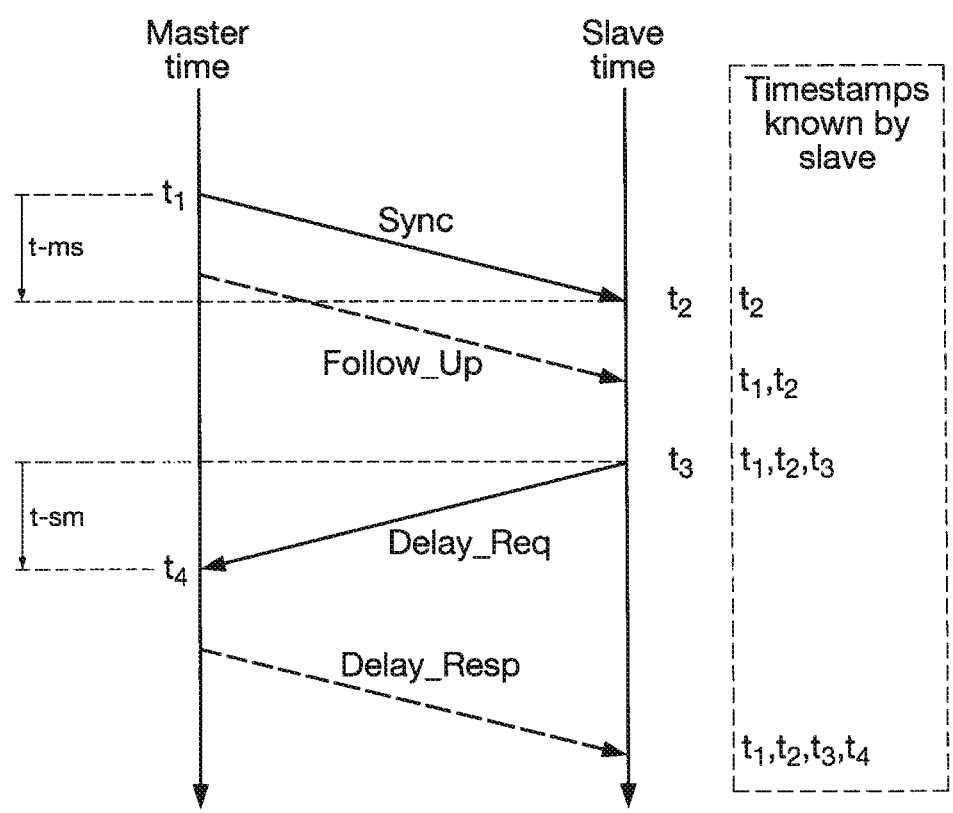
FIG. 14 is an illustration of the exchange of time protocol signals in the method of FIG. 13.

Referring to FIGS. 13 and 14, a ninth embodiment of the invention provides a method 140 of synchronising a master clock at a first client node and a slave clock at a second client node across a server communications network.

The method 140 comprises: generating a first time protocol signal at the first client node at a first time, t1, mapping the first time protocol signal onto a first transmission signal, and transmitting the first transmission signal across the server communications network 142; receiving the first time protocol signal at the second client node at a second time, t2 144; providing the first time, t1, to the second client node 146; generating a second time protocol signal at the second client node, mapping the second time protocol signal onto a second transmission signal, and transmitting the second transmission signal across the server communications network at a third time, t3 148; receiving the second time protocol signal at the first client node at a fourth time, t4 150; providing the fourth time, t4, to the second client node 152; at a time protocol client at the second client node, calculating a mean path delay, $d_{mean}$, between the first client node and the second client node: $d_{mean}=[(t2-t1)+(t4-t3)]/2$ 154; providing a path delay asymmetry between the first client node and the second client node to the time protocol client 156; calculating an offset between the slave clock and the master clock in dependence on (t2-t1), the $d_{mean}$ and the path delay asymmetry 158; and varying a time of the slave clock to minimise the offset 160, 162.

The path delay asymmetry may be provided 156 using the method of any of the previous embodiments.

It will be appreciated that the mean path delay may equivalently be calculated as, $d_{mean}=[(t2-t3)+(t4-t1)]/2$ FIG. 14 illustrates a basic time protocol signal exchange pattern when using the PTP protocol for time synchronization.

The time protocol signal exchange pattern will be well known to the skilled man but will be described in brief for completeness. The time protocol signal exchange pattern is as follows: (1) The master sends a Sync message to the slave and notes the time, t1, at which it was sent. (2) The slave receives the Sync message and notes the time of reception, t2. (3) The master conveys to the slave the timestamp t1 by: (i) Embedding the timestamp t1 in the Sync message (this requires some sort of hardware processing for highest accuracy and precision) or (ii) Embedding the timestamp t1 in a Follow_Up message. (4) The slave sends a Delay_Req message to the master and notes the time, t3, at which it was sent. (5) The master receives the Delay_Req message and notes the time of reception, t4. (6) The master conveys to the slave the timestamp t4 by embedding it in a Delay_Resp message.

At the conclusion of this exchange of time protocol signals, the slave possesses all four timestamps. These timestamps may be used to compute the offset of the slave's clock with respect to the master and the mean path delay of time protocol signals between the two clocks.

The slave synchronizes to the master via the minimization of the <offsetFromMaster> value computed by the slave, where <offsetFromMaster>=<Time on the slave clock>-<Time on the master clock> where all times are measured at the same instant.

In particular, the <offsetFromMaster> value shall be computed by the slave as follows: <offsetFromMaster>=(t2-t1)-<meanPathDelay>-correctionField of Sync message-correctionField of Follow_Up message, where correction field of Sync message relates to the latency of the packet crossing an intermediate node.

As the skilled man will appreciated, a similar time protocol exchange pattern would be created if the NTP protocol was being used for time synchronisation and the method of this embodiment may be used for either PTP or NTP based time synchronisation

The invention claimed is:

1. A method of providing a path delay asymmetry for time synchronization between a master clock at a first client node and a slave clock at a second client node, the method comprising:
  receiving, at a path delay asymmetry calculation element, a determined forward mapping delay incurred as a result of mapping a first time protocol signal carrying time protocol data of the master clock onto a first transmission signal for transmission across a server communications network to the second client node;
  receiving, at the path delay asymmetry calculation element, a determined reverse mapping delay incurred as a result of mapping a second time protocol signal carrying time protocol data of the slave clock onto a second transmission signal for transmission across the server communications network to the first client node;
  receiving, at the path delay asymmetry calculation element, a determined forward forward error correction (FEC) delay incurred as a result of applying FEC to the first transmission signal;
  receiving, at the path delay asymmetry calculation element, a determined reverse FEC delay incurred as a result of applying FEC to the second transmission signal;
  at the path delay asymmetry calculation element, calculating a path delay asymmetry in dependence on the forward mapping delay, the reverse mapping delay, the forward FEC delay and the reverse FEC delay; and
  providing the calculated path delay asymmetry to a time protocol client at the second client node.

2. The method of claim 1, wherein
  the method further comprises: i) receiving, at the path delay asymmetry calculation element, a determined forward fibre delay incurred during transmission of the first transmission signal across the server communications network to the second client node; and ii) receiving, at the path delay asymmetry calculation element, a determined reverse fibre delay incurred during transmission of the second transmission signal across the server communications network to the first client node, and
  the path delay asymmetry is calculated in dependence on the forward mapping delay, the reverse mapping delay, the forward FEC delay, the reverse FEC delay, the forward fibre delay and the reverse fibre delay.

3. The method of claim 1, wherein
  the path delay asymmetry calculation element is provided at a server network management system of the server communications network,
  the path delay asymmetry calculation element receives each said delay by receiving a respective distribution signal indicative of each said delay transmitted to the server network management system, and
  the path delay asymmetry calculation element provides the calculated path delay asymmetry to the time protocol client by generating a path delay asymmetry signal indicative of the path delay asymmetry and transmitting the path delay asymmetry signal to the second client node.

4. The method of claim 3, wherein each distribution signal is transmitted across the control plane of the server communications network.

5. The method of claim 4, wherein each distribution signal comprises an open shortest path first traffic engineering protocol link state advertisement signal comprising a link type length value, TLV, object comprising a respective one of a first node sub-sub-TLV object and a second node sub-sub-TLV object, the first node sub-sub-TLV object comprising at least one of said forward delays and the second node sub-sub-TLV object comprising at least one of said reverse delays.

6. The method of claim 1, wherein the path delay asymmetry calculation element is provided at a client network management system of a client network comprising the second client node.

7. The method of claim 6, wherein:
the path delay asymmetry calculation element receives each said delay by receiving a re-distribution signal indicative of each said delay transmitted on an inter-network management system communications channel of the server communications network to the client network management system, and
the path delay asymmetry calculation element provides the calculated path delay asymmetry to the time protocol client by generating a path delay asymmetry signal indicative of the path delay asymmetry at the client network management system and transmitting the path delay asymmetry signal to the second client node.

8. The method of claim 1, wherein
the first client node is coupled to the server communications network through a first border node of the server communications network,
the second client node is coupled to the server communications network through a second border node of the server communications network,
the first border node comprises a first mapping node,
the second border node comprises a second mapping node,
the path delay asymmetry calculation element is provided at the second mapping node,
the path delay asymmetry calculation element receives each said forward delay by receiving a respective distribution signal indicative of each said forward delay and transmitted to the second mapping node, and
the path delay asymmetry calculation element provides the calculated path delay asymmetry to the time protocol client by generating a path delay asymmetry signal indicative of the path delay asymmetry at the second mapping node and transmitting the path delay asymmetry signal to the second client node.

9. The method of claim 6, wherein
the first time protocol signal is mapped onto the first transmission signal at the first mapping node,
the second time protocol signal is mapped onto the second transmission signal at the second mapping node,
FEC is applied to the first transmission signal at the first mapping node,
FEC is applied to the second transmission signal at the second mapping node,
each said forward delay is determined at the first mapping node, and
each said reverse delay is determined at the second mapping node.

10. The method of claim 1, wherein
the first client node is coupled to the server communications network through a first border node of the server communications network,
the second client node is coupled to the server communications network through a second border node of the server communications network,
the first border node comprises a first mapping node,
the second border node comprising a second mapping node,
the path delay asymmetry calculation element is provided at the second client node,
the path delay asymmetry calculation element receives each said delay by receiving a delays signal indicative of each said delay transmitted to the second client node.

11. The method of claim 1, wherein the method further comprises calculating a delay asymmetry attribute comprising one half of the path delay asymmetry and the path delay asymmetry signal is indicative of the delay asymmetry attribute.

12. The method of claim 1, wherein the server communications network comprises an optical communications network having an optical transport network layer.

13. A path delay asymmetry calculation apparatus for providing a path delay asymmetry for time synchronization between a master clock at a first client node and a slave clock at a second client node, the apparatus being adapted to:
receive a determined forward mapping delay incurred as a result of mapping a first time protocol signal carrying time protocol data of the master clock onto a first transmission signal for transmission across a server communications network to the second client node;
receive a determined reverse mapping delay incurred as a result of mapping a second time protocol signal carrying time protocol data of the slave clock onto a second transmission signal for transmission across the server communications network to the first client node;
receive a determined forward forward error correction (FEC) delay incurred as a result of applying FEC to the first transmission signal;
receive a determined reverse FEC delay incurred as a result of applying FEC to the second transmission signal;
calculate a path delay asymmetry in dependence on the forward mapping delay, the reverse mapping delay, the forward FEC delay and the reverse FEC delay; and
provide the calculated path delay asymmetry to a time protocol client at the second client node.

14. The path delay asymmetry calculation apparatus of claim 13, wherein the path delay asymmetry calculation apparatus is further adapted to:
receive a determined forward fibre delay incurred during transmission of the first transmission signal across the server communications network to the second client node;
receive a determined reverse fibre delay incurred during transmission of the second transmission signal across the server communications network to the first client node, and
calculate the path delay asymmetry in dependence on the forward mapping delay, the reverse mapping delay, the forward FEC delay, the reverse FEC delay, the forward fibre delay and the reverse fibre delay.

15. The path delay asymmetry calculation apparatus of claim 13, wherein
the path delay asymmetry calculation apparatus is provided at a server network management system of the server communications network,
the path delay asymmetry calculation apparatus is adapted to receive each said delay by receiving a respective distribution signal indicative of each said delay transmitted to the server network management system, and
the path delay asymmetry calculation apparatus is adapted to provide the calculated path delay asymmetry to the time protocol client by generating a path delay asymmetry signal indicative of the path delay asymmetry and transmitting the path delay asymmetry signal to the second client node.

16. The path delay asymmetry calculation apparatus of claim 15, wherein each distribution signal is transmitted across the control plane of the server communications network.

17. The path delay asymmetry calculation apparatus of claim 16, wherein each distribution signal comprises an open shortest path first traffic engineering protocol link state advertisement signal comprising a link type length value, TLV, object comprising a respective one of a first node sub-sub-TLV object and a second node sub-sub-TLV object, the first node sub-sub-TLV object comprising at least one of said forward delays and the second node sub-sub-TLV object comprising at least one of said reverse delays.

18. The path delay asymmetry calculation apparatus of claim 13, wherein the path delay asymmetry calculation apparatus is provided at a client network management system of a client network comprising the second client node.

19. The path delay asymmetry calculation apparatus of claim 18, wherein:
the path delay asymmetry calculation apparatus is adapted to receive each said delay by receiving a re-distribution signal indicative of each said delay transmitted on an inter-network management system communications channel of the server communications network to the client network management system, and
the path delay asymmetry calculation apparatus is adapted to provide the calculated path delay asymmetry to the time protocol client by generating a path delay asymmetry signal indicative of the path delay asymmetry at the client network management system and transmitting the path delay asymmetry signal to the second client node.

20. The path delay asymmetry calculation apparatus of claim 13, wherein
the first client node is coupled to the server communications network through a first border node of the server communications network,
the second client node is coupled to the server communications network through a second border node of the server communications network,
the first border node comprises a first mapping node,
the second border node comprises a second mapping node,
the path delay asymmetry calculation apparatus is provided at the second mapping node,
the path delay asymmetry calculation apparatus is adapted to receive each said forward delay by receiving a respective distribution signal indicative of each said forward delay and transmitted to the second mapping node, and
the path delay asymmetry calculation apparatus is adapted to provide the calculated path delay asymmetry to the time protocol client by generating a path delay asymmetry signal indicative of the path delay asymmetry at the second mapping node and transmitting the path delay asymmetry signal to the second client node.

21. The path delay asymmetry calculation apparatus of claim 18, wherein
the first time protocol signal is mapped onto the first transmission signal at the first mapping node,
the second time protocol signal is mapped onto the second transmission signal at the second mapping node,
FEC is applied to the first transmission signal at the first mapping node,
FEC is applied to the second transmission signal at the second mapping node,
each said forward delay is determined at the first mapping node, and
each said reverse delay is determined at the second mapping node.

22. The path delay asymmetry calculation apparatus of claim 13, wherein
the first client node is coupled to the server communications network through a first border node of the server communications network,
the second client node is coupled to the server communications network through a second border node of the server communications network,
the first border node comprises a first mapping node,
the second border node comprising a second mapping node,
the path delay asymmetry calculation apparatus is provided at the second client node,
the path delay asymmetry calculation apparatus is adapted to receive each said delay by receiving a delays signal indicative of each said delay transmitted to the second client node.

23. The path delay asymmetry calculation apparatus of claim 13, wherein the path delay asymmetry calculation apparatus is further adapted to calculate a delay asymmetry attribute comprising one half of the path delay asymmetry and the path delay asymmetry signal is indicative of the delay asymmetry attribute.

24. The path delay asymmetry calculation apparatus of claim 13, wherein the server communications network comprises an optical communications network having an optical transport network layer.

* * * * *

UNITED STATES PATENT AND TRADEMARK OFFICE
CERTIFICATE OF CORRECTION

PATENT NO. : 9,686,034 B2  
APPLICATION NO. : 14/747416  
DATED : June 20, 2017  
INVENTOR(S) : Ruffini et al.

Page 1 of 2

It is certified that error appears in the above-identified patent and that said Letters Patent is hereby corrected as shown below:

On the Title Page

In Item (56), under "OTHER PUBLICATIONS", in Column 2, Line 1, delete "pver" and insert -- over --, therefor.

On Page 2, in Item (56), under "OTHER PUBLICATIONS", in Column 2, Line 12, delete "Extentions" and insert -- Extensions --, therefor.

In the Specification

In Column 1, Line 9, delete "US 2014/0079409)," and insert -- US 2014/0079409), now Pat. No 9,094,142, --, therefor.

In Column 1, Line 57, delete "supervisory," and insert -- supervisory channel, --, therefor.

In Column 1, Line 66, delete "()N" and insert -- OTN --, therefor.

In Column 14, Line 51, delete "first mapping node 69" and insert -- first mapping node 65 --, therefor.

In Column 15, Line 48, delete "$d_m$," and insert -- $d_{mr}$, --, therefor.

In Column 15, Line 54, delete "server," and insert -- server --, therefor.

In Column 16, Line 38, delete "$d_{mr}$," and insert -- $d_{mr}$ --, therefor.

In Column 17, Line 27, delete "$d_{mean}=[(t2-t3)+(t4-t1)]/2$" and insert -- $d_{mean} =[(t2-t3)+(t4-t1)]/2$. --, therefor.

Signed and Sealed this  
Twelfth Day of September, 2017

Joseph Matal  
*Performing the Functions and Duties of the*  
*Under Secretary of Commerce for Intellectual Property and*  
*Director of the United States Patent and Trademark Office*

CERTIFICATE OF CORRECTION (continued)
U.S. Pat. No. 9,686,034 B2

In Column 17, Line 67, delete "synchronisation" and insert -- synchronisation. --, therefor.

In the Claims

In Column 20, Line 51, in Claim 14, delete "node, and" and insert -- node; and --, therefor.